(12) United States Patent
Kodama

(10) Patent No.: US 9,645,521 B2
(45) Date of Patent: May 9, 2017

(54) IMAGE FORMING APPARATUS

(71) Applicant: CANON KABUSHIKI KAISHA, Tokyo (JP)

(72) Inventor: Hirokazu Kodama, Ryugasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/708,629

(22) Filed: May 11, 2015

(65) Prior Publication Data
US 2015/0338764 A1 Nov. 26, 2015

(30) Foreign Application Priority Data

May 23, 2014 (JP) ................................. 2014-107484

(51) Int. Cl.
G03G 15/043 (2006.01)
H04N 1/113 (2006.01)
B41J 2/47 (2006.01)
G02B 26/12 (2006.01)

(52) U.S. Cl.
CPC .............. G03G 15/043 (2013.01); B41J 2/47 (2013.01); G02B 26/123 (2013.01); H04N 1/113 (2013.01)

(58) Field of Classification Search
CPC ............. G03G 15/041; G03G 15/0415; G03G 14/043; G02B 26/123; H04N 1/113; B41J 2/47

See application file for complete search history.

(56) References Cited

U.S. PATENT DOCUMENTS

| 6,005,243 | A | * | 12/1999 | Yamazaki | ............ | G02B 26/123 |
| | | | | | | 250/205 |
| 8,922,847 | B2 | | 12/2014 | Nakahata | ....................... | 358/474 |
| 2003/0156184 | A1 | * | 8/2003 | Suzuki | ................. | G02B 26/123 |
| | | | | | | 347/249 |
| 2013/0286132 | A1 | | 10/2013 | Yamazaki | ...................... | 347/118 |
| 2013/0286133 | A1 | | 10/2013 | Furuta et al. | ................. | 347/118 |

FOREIGN PATENT DOCUMENTS

| JP | 2008-089695 | 4/2008 |
| JP | 2013-226753 | 11/2013 |
| JP | 2013-240994 | 12/2013 |

* cited by examiner

Primary Examiner — Sarah Al Hashimi
(74) Attorney, Agent, or Firm — Fitzpatrick, Cella, Harper & Scinto

(57) ABSTRACT

In an image forming apparatus including multiple light emitting elements, upon receiving an instruction from a user to execute correction (first correction) of a phase shift due to a shift in the relative positions of an optical scanning apparatus and the photosensitive member, a CPU executes correction (second correction) of a phase shift due to temperature change in the image forming apparatus. Thereafter, the CPU performs image formation control such that a phase adjustment image is formed on a recording medium, and determines a phase adjustment value based on an adjustment value input by the user. The CPU sets the phase adjustment value in the optical scanning apparatus to correct the phase shift. Thus, when the first correction is to be executed, the CPU executes the second correction before executing the first correction.

17 Claims, 18 Drawing Sheets

MAIN SCANNING DIRECTION

MAIN SCANNING DIRECTION

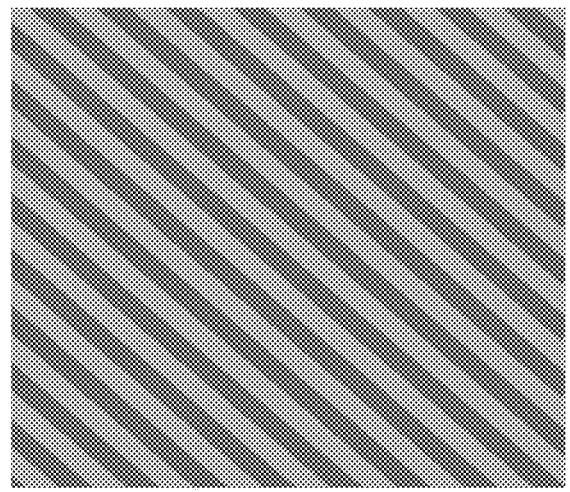
F I G. 16A
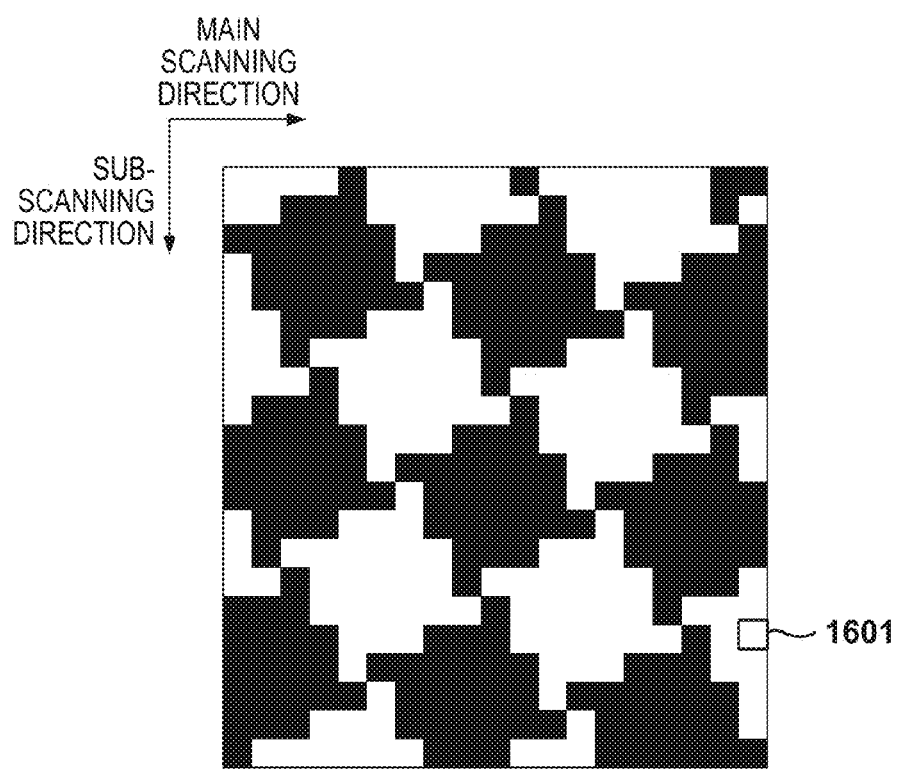
F I G. 16B

IMAGE FORMING APPARATUS

BACKGROUND OF THE INVENTION

Field of the Invention

The present invention relates to an electrophotographic image forming apparatus.

Description of the Related Art

In recent years, higher numbers of laser beams have been used in image forming apparatuses accompanying higher image formation speeds and higher image resolution in image forming apparatuses. Also, as electrophotographic image forming apparatuses (printers) continue to enter the light printing market, it is desired that high-quality image formation can be performed on various types of screens used in the printing market, even with an electrophotographic method.

However, in the case of increasing the number of beams used in an image forming apparatus, if small shifts in the position in the main scanning direction of pixels formed on a photosensitive member (photosensitive drum) by the light beams (laser beams) occur, such a shift will occur periodically in the sub-scanning direction. As a result, a moiré pattern appears due to interference with the screen. For example, with screens used in the printing market, it has been demonstrated that a moiré pattern (interference pattern) will appear if a position shift of 6 µm or more occurs between beams.

FIG. 16A is a diagram showing an example of a 50% half-tone screen image (hereinafter referred to as an "HT image"). The unevenness in density, which is caused by a shift in the image formation positions of multiple laser beams (phase shift) in the main scanning direction, appears as an interference pattern in the HT image shown in FIG. 16A. Note that the HT image shown in FIG. 16A is around 10 mm by 10 mm in area, and the interference pattern that is inclined 45 degrees to the left appears in cycles of about 1 mm. If there is no phase shift, this kind of interference pattern does not appear in the HT image, and a uniform halftone density appears on the HT screen. Also, FIG. 16B shows an enlarged image of a 50% ideal HT image, which is around 0.4 mm by 0.4 mm in area. A screen corresponding to a 50% HT area in which a pixel 1601 corresponds to one 1200-dpi pixel is shown.

Also, FIG. 17 shows an enlarged image of the 50% HT image shown in FIG. 16A, in which the density unevenness caused by the phase shift is enlarged. The thin lines shown in FIG. 17 are auxiliary lines that have been added to make the units of the screen easier to understand. FIGS. 16B and 17 show cases of scanning a photosensitive member using eight beams, in which a 0.5-pixel shift in the main scanning direction has occurred between two groups, namely laser beams 1 to 4 and laser beams 5 to 8, the phase shift between laser beam 1 and laser beam 8 is 0.5 pixels, and the image slopes by a ratio of 0.5 to 8 (corresponds to around 3.6 degrees). The periodicity of the phase shift can be checked using the difference in level in the auxiliary lines in FIG. 17.

In FIG. 17, the interference pattern influenced by the phase shift appears due to the differences in level in 8-beam periods, and interference at fine connection portions in the HT image. The HT fine connection portions correspond to portions that are opposed in an oblique arrangement in the alignment of pixels in the sub-scanning direction. Dotted line 1701 and dotted line 1703 in FIG. 17 show portions shifted in the direction in which the alignment of the pixels at the fine connection portions overlaps due to the difference in level at a border portion of the phase shift of the lasers. Also, dotted line 1702 shows portions shifted in the direction in which the overlapping of the fine connection portions is separated by the difference in level at the border portion of the phase shift.

The portions indicated by arrows on the dotted line 1701 and the dotted line 1703 are portions at which toner developing is more likely to be performed due to the influence of the fine connection portions. The portions indicated by arrows on the dotted line 1702 are portions at which toner developing is less likely to be performed due to the influence of the fine connection portions. These cause the interference pattern to appear. When the phase is shifted about 45 degrees in the left-oblique direction, the interference pattern appears in cycles of about 0.83 mm due to the interval between the dotted line 1701 and the dotted line 1703. Based on the structure of the fine connection portions, it is reasoned that the phase shift tends to increase monotonically until the phase is shifted by one pixel, or in other words, a ratio of 1 to 8 (about 7.1 degrees).

The reason that toner development is more likely to be performed at portions shifted in the direction in which the pixel alignment of the fine line connection portions overlaps is because the exposure distribution of one laser spot is not square-shaped, but forms a circular Gaussian distribution having a diameter of 1.5 to 2 pixels. Laser spots tend to exhibit a density that is higher than the number of pixels due to an increase in the overlapping of one pixel or less and exhibit a relatively lower density due to increases in the distance between spots of around one pixel or less, and therefore a regular interference pattern appears.

Conventionally, in order to deal with a phase shift such as that described above, the formation positions of pixels have been controlled by measuring the phase difference between beams with respect to the writing start positions of the pixels by the laser beams and adjusting the phases of the laser beams based on the measurement result (e.g., Japanese Patent Laid-Open No. 2008-89695). Furthermore, at multiple different positions in the main scanning direction, the amount of shifting between the formation position and the ideal position of a pixel is measured for each laser beam, and the partial magnification in each of multiple different regions in the main scanning direction is corrected based on the measurement result. Thus, a shift in the pixel formation positions from the ideal positions is prevented from occurring in the entire region in the main scanning direction scanned by the laser beams.

Also, in an image forming apparatus such as that described above, if the relative positions of the optical scanning apparatus that scans multiple laser beams and the photosensitive member (photosensitive drum) that is scanned by the multiple laser beams is not appropriate, the focus will shift when the laser beams scan the photosensitive drum. As a result, a phase shift in the laser beams such as that described above can occur. This kind of phase shift increases in amount the smaller the diameter of the photosensitive drum is and the larger the number of beams there are in the optical scanning apparatus. For example, if the diameter of the photosensitive drum is 30 mm and the number of beams is 16, there are cases where a phase shift of around 4 µm at most occurs between the laser beams on the two ends of the multiple laser beams, which are aligned in a straight line. For this kind of phase shift, a method is known in which the phase shift is corrected by outputting an image for measuring the phase shift and obtaining the phase shift from the output image.

Furthermore, in an image forming apparatus including multiple light emitting elements, if the internal temperature rises due to heat emitted from the light emitting elements and a polygon motor, optical characteristics (refractive index, etc.) of a scan lens and the like change and the relative scan positions of the multiple laser beams on the photosensitive drum change. That is to say, a position shift (phase shift) in the main scanning direction appears in the electrostatic latent image formed on the photosensitive drum by the laser beams. Accordingly, even if adjustment (correction) of the phase and correction of the partial magnification of the laser beams is performed as described above, the phase shift occurs due to temperature change in the image forming apparatus. Correction of a phase shift due to temperature change in the image forming apparatus (phase shift due to environmental variation) can be realized by, for example, obtaining the relationship (phase shift characteristic) between the temperature of the image forming apparatus and the phase shift that occurs in the multiple laser beams in advance using measurement or theoretical consideration.

However, in an image forming apparatus such as that described above, there is a possibility that the correction accuracy will deteriorate depending on the environmental conditions at the time of performing correction of a phase shift due to a shift in the relative positions of the optical scanning apparatus and the photosensitive drum (phase shift due to relative position shift). Specifically, since the environment at the time of acquiring correction data during factory assembly of the apparatus and the market usage environment are not the same, there is a possibility that a phase shift cannot be corrected with sufficient accuracy using the correction data stored at the factory. Also, in an image forming apparatus configured such that, in the market, an operator causes the apparatus to store correction data by using a test image output by the apparatus, the environmental state in which the test image is generated and the environmental state at the time of subsequently forming an image are different, and therefore there is a possibility that a phase shift cannot be corrected with sufficient accuracy using the correction data generated from the test image.

SUMMARY OF THE INVENTION

The present invention has been made in view of the above-mentioned problems. The present invention provides a technique for, in an image forming apparatus including multiple light emitting elements, correcting a phase shift with greater accuracy when multiple light beams emitted from the multiple light emitting elements scan a photosensitive member.

According to one aspect of the invention, there is provided an image forming apparatus, comprising: a light source configured to include a plurality of light emitting elements that are each configured to emit a light beam for exposing a photosensitive member; a deflection unit configured to deflect a plurality of light beams emitted from the plurality of light emitting elements such that the plurality of light beams scan the photosensitive member; an image forming unit configured to form an image by developing an electrostatic latent image formed on the photosensitive member by exposure using the plurality of light beams; a correction unit configured to execute first correction to cause the image forming unit to form an image for correction and to correct, based on the formed image for correction, relative emission timings according to which the plurality of light emitting elements emit light beams based on image data, and second correction to measure a parameter corresponding to a state of the plurality of light beams scanning the photosensitive member and to correct, based on a value of the measured parameter, the relative emission timings for the plurality of light emitting elements; and a control unit configured to control the light source such that the plurality of light emitting elements emit light beams based on image data in accordance with the relative emission timings corrected by the correction unit, wherein when the first correction is to be executed, the correction unit executes the second correction before executing the first correction.

According to the present invention, it is possible to, in an image forming apparatus including multiple light emitting elements, correct a shift in phase with greater accuracy when multiple light beams emitted from the multiple light emitting elements scan a photosensitive member.

Further features of the present invention will become apparent from the following description of exemplary embodiments with reference to the attached drawings.

BRIEF DESCRIPTION OF THE DRAWINGS

FIGS. 16A and 16B are diagrams showing an example of a 50% HT image in which density unevenness due to a phase shift appears, and an example of an enlarged image of a 50% ideal HT image.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First to third embodiments will be described below taking the example of an image forming apparatus that forms multi-color (full-color) images using multiple colors of toner (developing material). Note that the embodiments can be applied to an image forming apparatus that forms monochrome images using only a single color of toner (e.g., black).

First Embodiment

Hardware Configuration of Image Forming Apparatus

Figure 1:
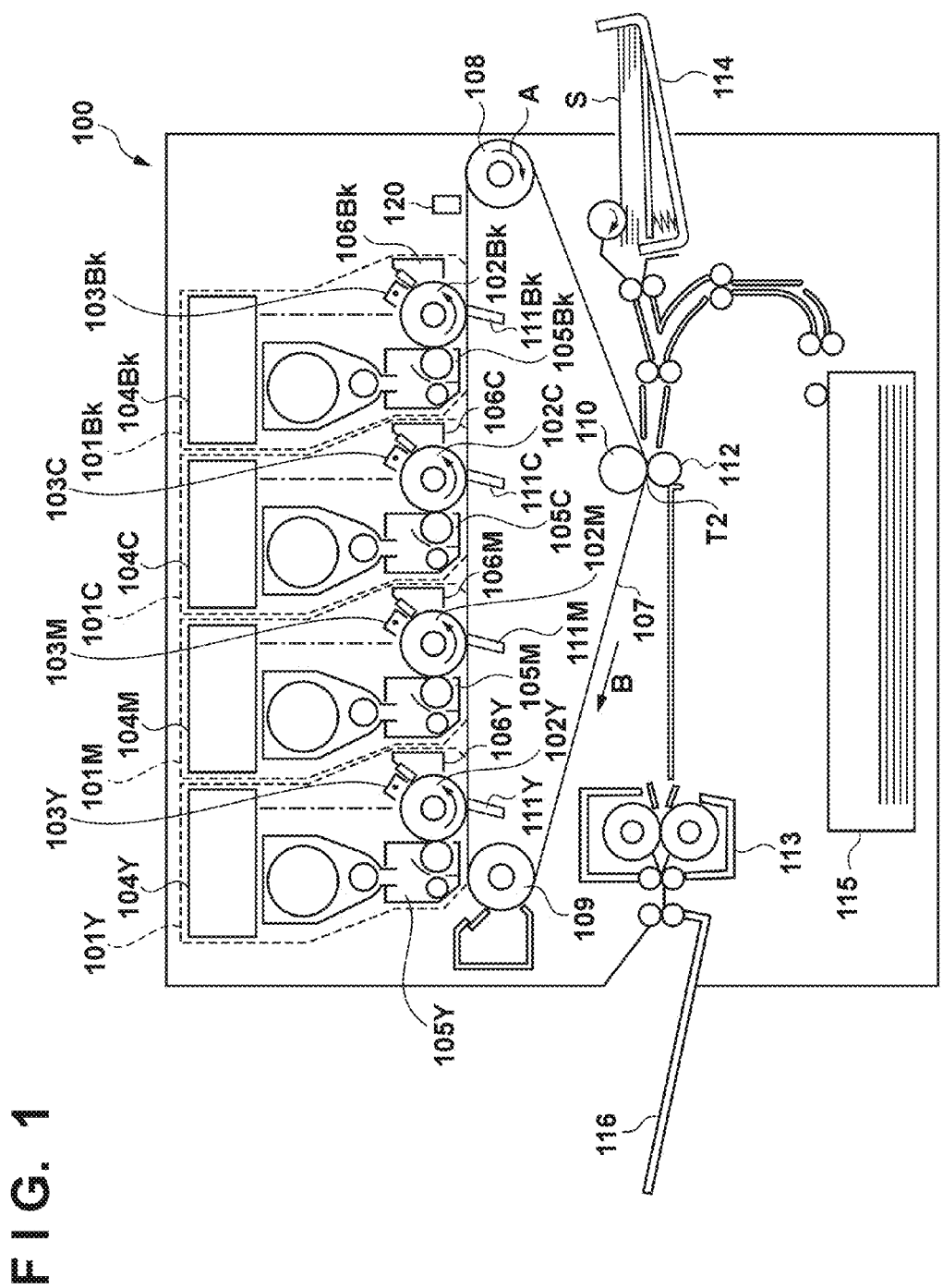
FIG. 1 is a cross-section showing a schematic configuration of an image forming apparatus.

First, a configuration of an image forming apparatus 100 according to the present embodiment will be described with reference to FIG. 1. The image forming apparatus 100 includes four image forming units 101Y, 101M, 101C, and 101Bk that form images (toner images) using yellow (Y), magenta (M), cyan (C), and black (Bk) toner respectively.

The image forming units 101Y, 101M, 101C, and 101Bk include photosensitive drums (photosensitive members) 102Y, 102M, 102C, and 102Bk respectively. Charging units 103Y, 103M, 103C, and 103Bk, optical scanning apparatuses 104Y, 104M, 104C, and 104Bk, and developing units 105Y, 105M, 105C, and 105Bk are arranged in the vicinity of the photosensitive drums 102Y, 102M, 102C, and 102Bk respectively. Drum cleaning units 106Y, 106M, 106C, and 106Bk are furthermore arranged in the vicinity of the photosensitive drums 102Y, 102M, 102C, and 102Bk respectively.

An intermediate transfer belt (intermediate transfer member) 107 in the shape of an endless belt is arranged below the photosensitive drums 102Y, 102M, 102C, and 102Bk. The intermediate belt 107 is wound around a driving roller 108, and driven rollers 109 and 110. When image formation is in progress, the peripheral surface of the intermediate transfer belt 107 moves in the direction of arrow B in accordance with the rotation of the driving roller 108 in the direction of arrow A shown in FIG. 1. Primary transfer units 111Y, 111M, 111C, and 111Bk are arranged at positions opposing the photosensitive drums 102Y, 102M, 102C, and 102Bk via the intermediate transfer belt 107. The image forming apparatus 100 further includes a secondary transfer unit 112 for transferring a toner image formed on the intermediate transfer belt 107 onto a recording medium S, and a fixing unit 113 for fixing, to the recording medium S, toner image that has been transferred onto the recording medium S.

Image forming processes from a charging process to a developing process in the image forming apparatus 100 having the above-described configuration will be described next. Note that the image forming processes executed by the respective image forming units 101Y, 101M, 101C, and 101Bk are similar. For this reason, a description will be given below using the image forming process in the image forming unit 101Y as an example, and the image forming processes in the image forming units 101M, 101C, and 101Bk will not be described.

First, the charging unit 103Y in the image forming unit 101Y charges the surface of the photosensitive drum 102Y that is being driven so as to rotate. The optical scanning apparatus 104Y emits multiple laser beams (light beams), scans the charged surface of the photosensitive drum 102Y using the laser beams, and thereby exposes the surface of the photosensitive drum 102Y. According to this, an electrostatic latent image is formed on the rotating photosensitive drum 102Y. After being formed on the photosensitive drum 102Y, the electrostatic latent image is developed by the developing unit 105Y using Y toner. As a result, a Y toner image is formed on the photosensitive drum 102Y. Also, in the image forming units 101M, 101C, and 101Bk, M, C, and Bk toner images are formed on the photosensitive drums 102M, 102C, and 102Bk respectively with processes similar to that of the image forming unit 101Y.

The image forming processes from a transfer process onward will be described below. In the transfer process, first, the primary transfer units 111Y, 111M, 111C, and 111Bk each apply a transfer bias to the intermediate transfer belt 107. According to this, toner images of four colors (Y, M, C, and Bk) that have been formed on the photosensitive drums 102Y, 102M, 102C, and 102Bk are transferred in an overlaid manner onto the intermediate transfer belt 107.

After being formed on the intermediate transfer belt 107 in an overlaid manner, the toner image composed of four colors of toner is conveyed to a secondary transfer nip portion between the secondary transfer unit 112 and the intermediate transfer belt 107 in accordance with the movement of the peripheral surface of the intermediate transfer belt 107. The recording medium S is conveyed from a manual feeding cassette 114 or a paper feeding cassette 115 to the secondary transfer nip portion in synchronization with the timing at which the toner image formed on the intermediate transfer belt 107 is conveyed to the secondary transfer nip portion. In the secondary transfer nip portion, the toner image formed on the intermediate transfer belt 107 is transferred onto the recording medium S by means of a transfer bias applied by the secondary transfer unit 112 (secondary transfer).

After being formed on the recording medium S, the toner image undergoes heating in the fixing unit 113 and is thereby fixed to the recording medium S. After a multi-color (full color) image is formed in this way on the recording medium S, the recording medium S is discharged to a discharge unit 116.

Note that after the transfer of the toner image onto the intermediate transfer belt 107 ends, toner remaining on the photosensitive drums 102Y, 102M, 102C, and 102Bk is removed by the drum cleaning units 106Y, 106M, 106C, and 106Bk respectively. When the series of image forming processes ends in this way, image forming processes for the next recording medium S are subsequently started.

The image forming apparatus 100 includes an image sensor 120 arranged at a position at which it is possible to read a toner image on the intermediate transfer belt 107. As will be described later, the image sensor 120 is used for reading an image for phase adjustment of multiple laser beams emitted from the optical scanning apparatuses 104Y, 104M, 104C, and 104Bk in the case where the image has been formed on the intermediate transfer belt 107.

Hardware Configuration of Optical Scanning Apparatus

Next, a configuration of the optical scanning apparatuses 104Y, 104M, 104C, and 104Bk will be described with reference to FIG. 2 and FIGS. 3A to 3C. Note that since the configurations of the image forming units 101Y, 101M, 101C, and 101Bk are the same, there are cases below where reference numerals are used without the suffixes Y, M, C, and Bk. For example, "photosensitive drum 102" represents the photosensitive drums 102Y, 102M, 102C, and 102Bk, and "optical scanning apparatus 104" represents the optical scanning apparatuses 104Y, 104M, 104C, and 104Bk.

Figure 2:
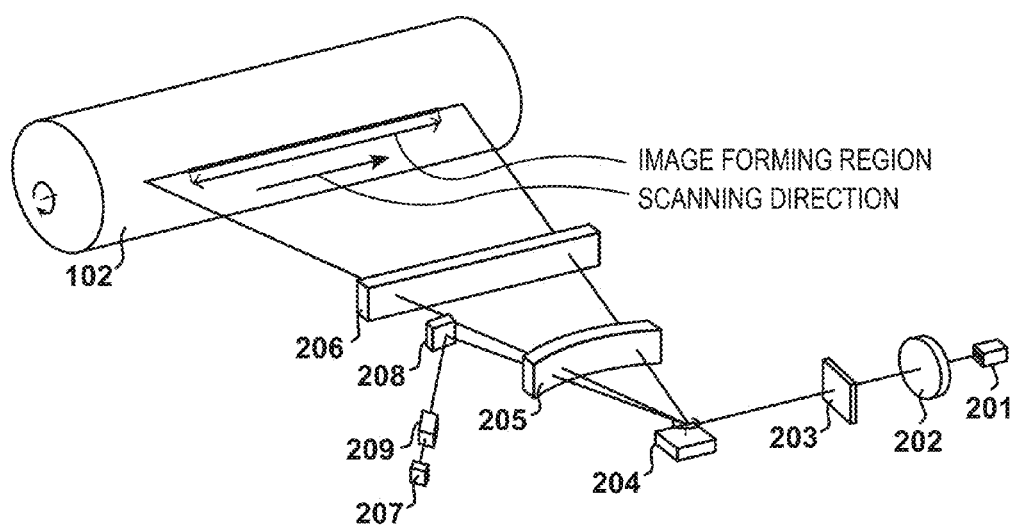
FIG. 2 is a diagram showing a schematic configuration of an optical scanning apparatus.

FIG. 2 is a diagram showing the configuration of the optical scanning apparatus 104. The optical scanning apparatus 104 includes a laser light source 201 and various optical members 202 to 206 (a collimator lens 202, a cylindrical lens 203, a polygon mirror (rotating polygonal mirror) 204, and fθ lenses 205 and 206). The laser light source (referred to hereinafter as simply "light source") 201 generates and outputs (emits) laser beams (light beams) with a light power that corresponds to the driving current. The collimator lens 202 shapes the laser beams emitted from the light source 201 into parallel beams. After the laser beams pass through the collimator lens 202, the cylindrical lens 203 condenses the laser beams in the sub-scanning direction (direction corresponding to the rotation direction of the photosensitive drum 102).

After passing through the cylindrical lens 203, the laser beams are incident on one of the reflecting surfaces of the polygon mirror 204. The polygon mirror 204 reflects the incident laser beams with the reflecting surfaces while rotating such that the incident laser beams are deflected at continuous angles. The laser beams deflected by the polygon mirror 204 are incident on the fθ lenses 205 and 206 in sequence. By passing through the fθ lenses (scanning lenses) 205 and 206, the laser beams become scanning beams that scan the surface of the photosensitive drum 102 at equal speeds.

On the scanning path of the laser beams deflected by the polygon mirror 204, the optical scanning apparatus 104 further includes a beam detection (BD) sensor 207 as an optical sensor for detecting laser beams. That is to say, the BD sensor 207 is provided on the scanning path for when the laser beams (light beams) are to scan the surface of the photosensitive drum 102. Note that with the optical scanning apparatus 104 shown in FIG. 2, a portion of the laser beams deflected by the polygon mirror 204 are reflected by a reflection mirror 208 so as to form an image on the light-receiving surface 207a (light receiving element) of the BD sensor 207 using the BD lens 209. When a laser beam deflected by the polygon mirror 204 is incident on the BD sensor 207, the BD sensor 207 outputs, as a synchronization signal (horizontal synchronization signal), a detection signal (BD signal) indicating that the laser beam has been detected. As will be described later, the synchronization signals output from the BD sensor 207 are used as a reference to control the timing of turning on the light emitting elements ($LD_1$ to $LD_N$) based on the image data.

Figure 3A:
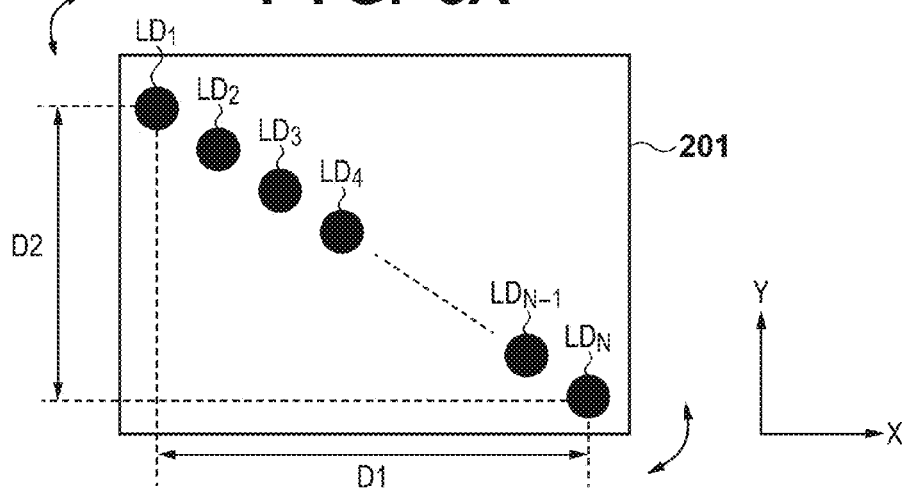
FIGS. 3A to 3C are diagrams showing schematic configurations of a light source and an example of scanning positions for laser beams emitted from the light source on a photosensitive drum and a BD sensor.
Figure 3B:
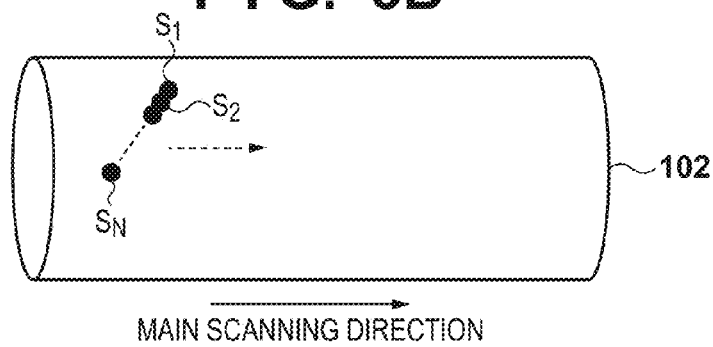

Next, the configuration of the light source 201 and the scanning positions of the laser beams emitted from the light source 201 on the photosensitive drum 102 and the BD sensor 207 will be described with reference to FIGS. 3A to 3C. First, FIG. 3A is an enlarged view of the light source 201, and FIG. 3B is a diagram showing the scanning positions of the laser beams emitted from the light source 201 on the photosensitive drum 102 (on the photosensitive member). The light source 201 includes N light emitting elements ($LD_1$ to $LD_N$) that each emit (output) a laser beam. The n-th (n being an integer from 1 to N) light emitting element n ($LD_n$) of the light source 201 emits a laser beam Ln. The X axis direction in FIG. 3A is the direction that corresponds to the direction in which the laser beams deflected by the polygon mirror 204 scan the photosensitive drum 102 (the main scanning direction). Also, the Y axis direction is the direction orthogonal to the main scanning direction, which is the direction that corresponds to the rotation direction of the photosensitive drum 102 (sub-scanning direction).

As shown in FIG. 3B, the laser beams $L_1$ to $L_N$ that have been emitted from the light emitting elements 1 to N form spot-shaped images at positions $S_1$ to $S_N$ that are different in the sub-scanning direction on the photosensitive drum 102. According to this, the laser beams $L_1$ to $L_N$ scan main scanning lines that are adjacent in the sub-scanning direction in parallel on the photosensitive drum 102. Also, due to the light emitting elements 1 to N being arranged in an array as shown in FIG. 3A in the light source 201, the laser beams $L_1$ to $L_N$ form images at positions on the photosensitive drum 102 that are different in the main scanning direction as well, as shown in FIG. 3B. Note that in FIG. 3A, the N light emitting elements ($LD_1$ to $LD_N$) are arranged in one straight line (one-dimensionally) in the light source 201, but they may be arranged two-dimensionally.

Reference numeral D1 in FIG. 3A represents the interval (distance) between the light emitting element 1 ($LD_1$) and the light emitting element N ($LD_N$) in the X axis direction. In the present embodiment, the light emitting elements 1 and N are light emitting elements arranged at the two ends of the light emitting elements that are arranged in a straight line in the light source 201. The light emitting element N is arranged the farthest from the light emitting element 1 in the X axis direction. For this reason, as shown in FIG. 3B, among the laser beams, the image forming position $S_N$ of the laser beam $L_N$ is at the position that is the farthest from the image forming position $S_1$ of the laser beam $L_1$ in the main scanning direction on the photosensitive drum 102.

Reference numeral D2 in FIG. 3A represents the interval (distance) between the light emitting element 1 ($LD_1$) and the light emitting element N ($LD_N$) in the Y axis direction. Among the light emitting elements, the light emitting element N is the farthest from the light emitting element 1 in the Y axis direction. For this reason, as shown in FIG. 3B, among the laser beams, the image forming position $S_N$ of the laser beam $L_N$ is at the position that is the farthest from the image forming position $S_1$ of the laser beam $L_1$ in the sub-scanning direction on the photosensitive drum 102.

A light emitting element interval Ps=D2/N−1 in the Y axis direction (sub-scanning direction) is an interval that corresponds to the resolution of the image that is to be formed by the image forming apparatus 100. Ps is a value that is set by performing rotation adjustment on the light source 201 in the assembly step of the image forming apparatus 100 such that the interval between adjacent image forming positions $S_n$ in the sub-scanning direction on the photosensitive drum 102 becomes an interval that corresponds to a predetermined resolution. As shown in FIG. 3A, the light source 201 is adjusted by rotation in the direction of the arrow in the plane (XY plane) including the X axis and the Y axis. When the light source 201 is rotated, the interval between the light emitting elements in the Y axis direction changes, and the interval between the light emitting elements in the X axis direction changes as well. A light emitting element interval Pm=D1/N−1 in the X axis direction (main scanning direction) is a value that is determined uniquely depending on the light emitting element interval Ps in the Y axis direction.

The timings according to which the laser beams are to be emitted from the light emitting elements ($LD_n$), and which are determined using the timing of the generation and output of the synchronization signals (BD signals) by the BD sensor 207 as a reference, are set for respective light emitting elements using a predetermined jig in the assembly step. The set timings for the respective light emitting elements are stored in a memory 406 (FIG. 4) as initial values at the time of factory shipping of the image forming apparatus 100. The initial values for the timings according to which the laser beams are to be emitted from the light emitting elements ($LD_n$) set in this way have values corresponding to Pm.

Figure 3C:
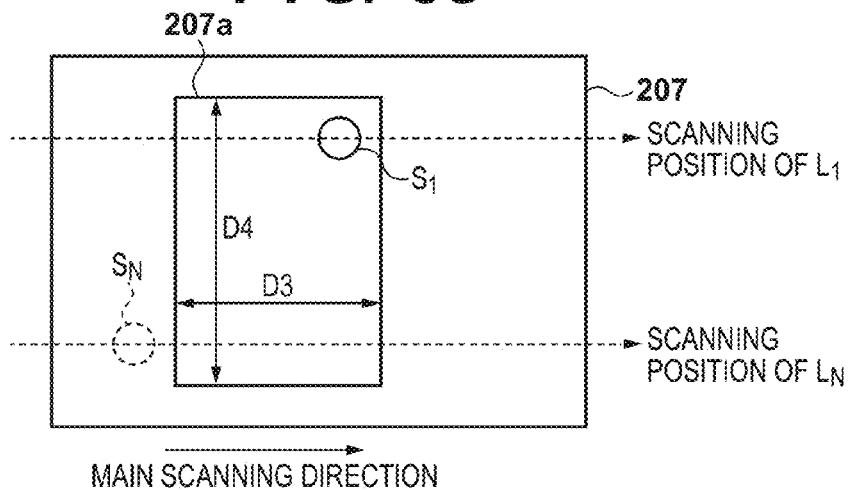

Next, FIG. 3C is a diagram showing a schematic configuration of the BD sensor 207 and the scanning positions of the laser beams emitted from the light source 201 on the BD sensor 207. The BD sensor 207 includes a light-receiving surface 207a on which photoelectric conversion elements are arranged planarly. When a laser beam is incident on the light-receiving surface 207a, the BD sensor 207 generates and outputs a BD signal (synchronization signal) indicating that a laser beam has been detected. The optical scanning apparatus 104 of the present embodiment causes laser beams $L_1$ and $L_N$ that have been emitted from the light emitting elements 1 and N ($LD_1$ and $LD_N$) to be successively incident on the BD sensor 207, and thus causes (two) BD signals corresponding to the laser beams to be successively output from the BD sensor 207. Note that in the present embodiment, the light emitting elements 1 and N ($LD_1$ and $LD_N$) are examples of a first light emitting element and a second light emitting element respectively, and the laser beams $L_1$ and $L_N$ are examples of a first light beam and a second light beam respectively.

In FIG. 3C, the width in the main scanning direction and the width in the direction corresponding to the sub-scanning direction of the light-receiving surface 207a are indicated as D3 and D4 respectively. In the present embodiment, the laser beams $L_1$ and $L_N$ that are emitted from the light emitting elements 1 and N ($LD_1$ and $LD_N$) respectively scan the light-receiving surface 207a of the BD sensor 207 as shown in FIG. 3C. For this reason, the width D4 is set to a value that satisfies the condition $D4 > D2 \times \alpha$, such that both of the laser beams $L_1$ and $L_N$ can be incident on the light-receiving surface 207a. Note that $\alpha$ is the rate of fluctuation in the sub-scanning direction with respect to the interval between the laser beams $L_1$ and $L_N$ that have passed through the various lenses. Also, the width D3 is set to a value that satisfies the condition $D3 < D1 \times \beta$, such that the laser beams $L_1$ and $L_N$ are not incident on the light-receiving surface 207a at the same time even if the light emitting elements 1 and N ($LD_1$ and $LD_N$) are turned on at the same time. Note that $\beta$ is the rate of fluctuation in the main scanning direction with respect to the interval between the laser beams $L_1$ and $L_N$ that have passed through the various lenses.

Control Configuration of Image Forming Apparatus

Figure 4:
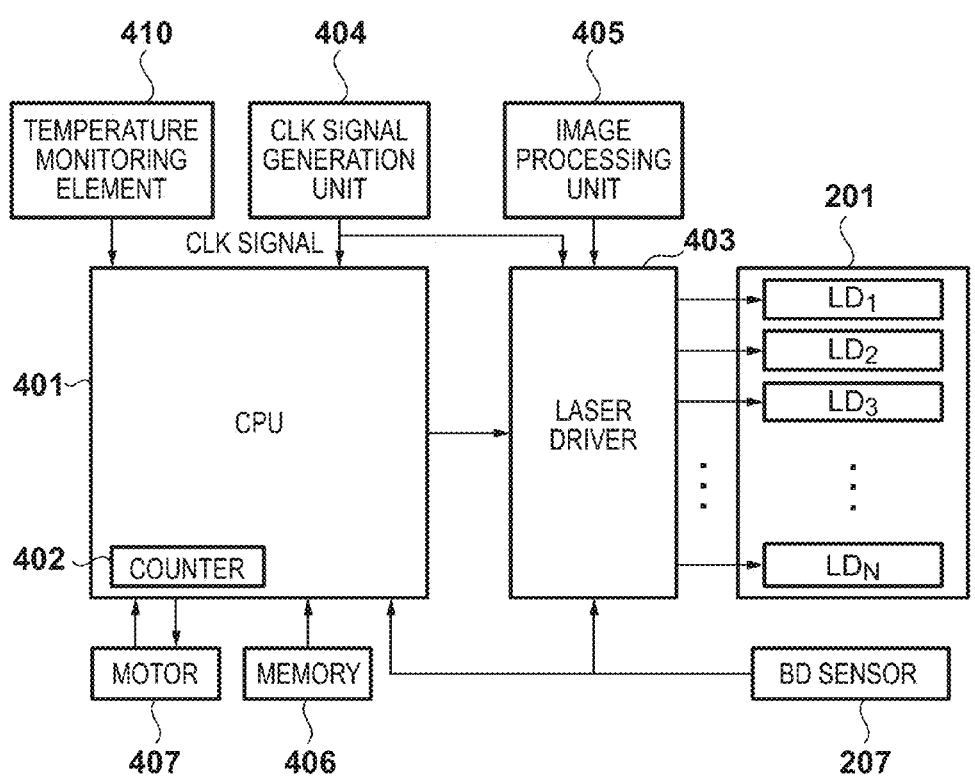
FIG. 4 is a block diagram showing an example of a control configuration of the image forming apparatus.

FIG. 4 is a block diagram showing the control configuration of the image forming apparatus 100 according to the present embodiment. The image forming apparatus 100 includes, as the control configuration, a CPU 401, a laser driver 403, a clock (CLK) signal generation unit 404, an image processing unit 405, the memory 406, a motor 407, and a temperature monitoring element 410. Note that in the present embodiment, the laser driver 403, the light source 201, and the BD sensor 207 shown in FIG. 4 are included in the optical scanning apparatus 104.

A counter 402 is included in the CPU 401, and the CPU 401 performs overall control of the image forming apparatus 100 by executing a control program stored in the memory 406. The CLK signal generation unit 404 generates clock signals (CLK signals) at a predetermined frequency and outputs the generated CLK signals to the CPU 401 and the laser driver 403. The CPU 401 uses the counter 402 to count the CLK signals input from the CLK signal generation unit 404 and outputs control signals to the laser driver 403 and the motor 407 in synchronization with the CLK signals.

The motor 407 is a polygon motor that drives the polygon mirror 204 so as to rotate. The motor 407 includes a speed sensor (not shown) that employs a frequency generator (FG) scheme for generating frequency signals that are proportionate to the rotation speed. The motor 407 uses the speed sensor to generate FG signals at a frequency corresponding to the rotation speed of the polygon mirror 204 and outputs the FG signals to the CPU 401. The CPU 401 measures the generation period of the FG signals input from the motor 407 based on the count value of the counter 402. When the measured generation period of the FG signals reaches a predetermined period, the CPU 401 determines that the rotation speed of the polygon mirror 204 has reached a predetermined speed.

The BD sensor 207 generates the BD signals in response to the detection of the laser beams and outputs the generated BD signals to the CPU 401 and the laser driver 403. The CPU 401 generates control signals for controlling the emission timings of the laser beams from the light emitting elements 1 to N ($LD_1$ to $LD_N$) based on the BD signals input from the BD sensor 207 and transmits the generated control signals to the laser driver 403. A driving current based on image data for image formation input from the image processing unit 405 (i.e., a driving current modulated according to the image data) is supplied by the laser driver 403 each of to the light emitting elements at a timing based on the control signals transmitted from the CPU 401. According to this, the laser driver 403 causes a laser beam having a light power that corresponds to the driving current to be emitted from each of the light emitting elements.

Also, the CPU 401 designates a light power target value for the light emitting elements 1 to N ($LD_1$ to $LD_N$) with respect to the laser driver 403, and instructs the laser driver 403 to execute APC for the light emitting elements at a timing based on the input BD signals. Here, APC is an operation in which the laser driver 403 controls the light power of the laser beam emitted from each of the light emitting elements 1 to N so as to be a light power that is equal to the light power target value. The laser driver 403 executes APC by adjusting the magnitude of the driving current supplied to each of the light emitting elements such that the light power of the light emitting element detected by a PD (photo diode) installed in the same package as the light emitting elements 1 to N match the light power target value. Thus, the laser driver 403 is an example of a light power control unit configured to control a light power of a laser beam (light beam) emitted from each of the light emitting elements.

Note that the laser driver 403 executes APC in the period designated by the CPU 401. Also, in the present embodiment, the light power target value that is to be used in the APC is set by using a density adjustment operation that is based on the detection of the toner image formed on the intermediate transfer belt 107.

Correction of Writing Start Position and Partial Magnification of Pixels

With the image forming apparatus 100, as shown in FIG. 3B, the image formation positions $S_1$ to $S_N$ of the laser beams $L_1$ to $L_N$ are different in the main scanning direction due to the configuration of the light source 201, shown in FIG. 3A. Also, variations in the partial magnification in regions in the main scanning direction occur due to the image formation positions of the laser beams varying from the ideal positions in the regions, which is caused by differences in the refractive index in the main scanning direction of the lens through which the laser beams pass. These kinds of variations in the partial magnification appear as variations that are different for each laser beam. Accordingly, the writing start positions and partial magnification of pixels in the main scanning direction need to be corrected in order to make the writing start positions in the main scanning direction of the pixels (electrostatic latent images) formed by the laser beams constant and to align the phases of the laser beams in the entirety of the scanning region in the main scanning direction.

This kind of correction of the writing start positions and partial magnification of the pixels is performed based on the result of measurement using the multiple laser beams $L_1$ to $L_N$, which is performed in the step of manufacturing the optical scanning apparatus (image forming apparatus). Specifically, in the step of manufacturing the optical scanning apparatus, a sensor for measurement is provided on the scanning line of the laser beams $L_1$ to $L_N$ on the photosensitive drum 102, and correction is performed based on the result of measuring a time when each of the laser beams passes through the position of the sensor while each of the light emitting elements is caused to emit light.

Hereinafter, methods for correcting the writing start positions of pixels in the main scanning direction using the laser beams $L_1$ to $L_N$ and for correcting the partial magnification in regions in the main scanning direction will be described with reference to FIG. 6 and FIGS. 7A to 7C.

Figure 6:
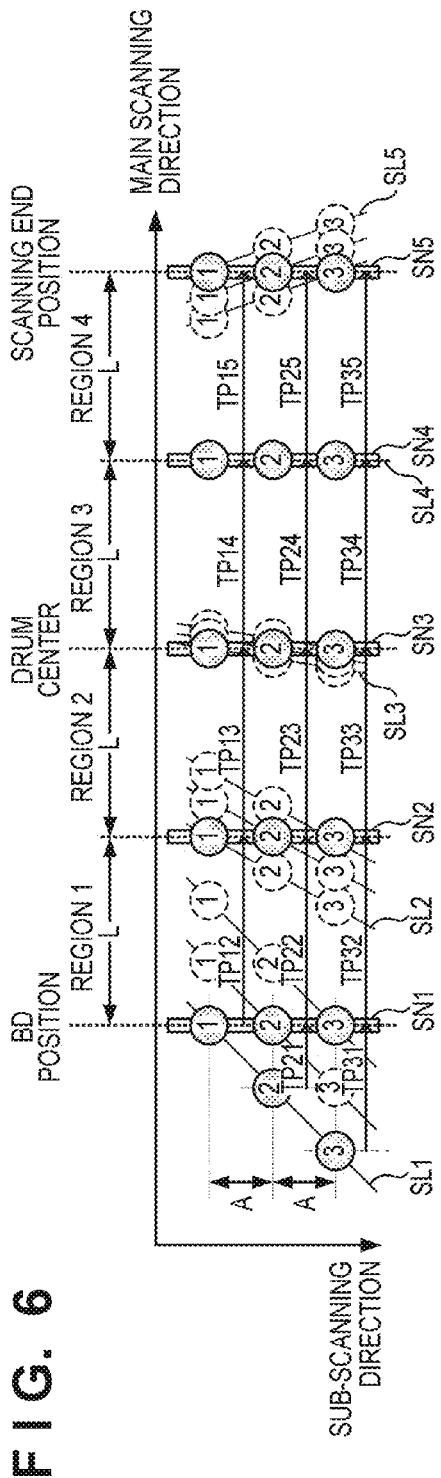
FIG. 6 is a diagram showing an example of measurement of timings at which multiple laser beams scanning a photosensitive drum pass through the positions of sensors SN1 to SN5.

FIG. 6 is a diagram for describing measurement of the timings when the laser beams $L_1$ to $L_N$ that scan the photosensitive drum 102 pass through the position of each of the sensors SN1 to SN5, the measurement being performed in the step of manufacturing the optical scanning apparatus 104. Note that in order to simplify the description, only three laser beams $L_1$ to $L_3$ among the laser beams $L_1$ to $L_N$ are shown in FIG. 6 and later-described FIGS. 7A to 7C, but the description applies similarly to the remaining laser beams $L_4$ to $L_N$.

In FIG. 6, the sensors SN1 to SN5 for detecting the laser beams are arranged at the same positions as the image formation positions $S_1$ to $S_N$ on the photosensitive drum 102 (i.e., on the main scanning line) and are separated at equal intervals by distance L in the main scanning direction. Note that the sensor SN1 is arranged at an image formation position (hereinafter referred to as "BD position") for laser beams in the case where laser beams are detected by the BD sensor 207. When the laser beams $L_1$ to $L_N$ scan the photosensitive drum 102 in the main scanning direction, they are detected by the sensors SN1 to SN5. Based on the timings when the laser beams $L_1$ to $L_N$ are detected by the sensors SN1 to SN5, time differences between the timings when the laser beams pass through the BD position (phase difference) and the amount of time needed for the laser beams to pass through a region of distance L between sensors are obtained.

First, the resolution (interval) between main scanning lines in the sub-scanning direction is adjusted to a desired resolution using rotational adjustment of the light source 201, as described above. In FIG. 6, the interval in the sub-scanning direction between adjacent ones of the image formation positions $S_1$ to $S_N$ of the laser beams $L_1$ to $L_N$ becomes A using this kind of adjustment. As a result, at the BD position, the laser beams $L_1$ to $L_N$ form images in a state in which the phases thereof are mutually shifted by an amount corresponding to SL1 in the main scanning direction. Specifically, the laser beam $L_2$ is detected later than laser beam $L_1$ by time (phase) TP21, by the sensor SN1 arranged at the BD position. The laser beam $L_3$ is detected later than laser beam $L_1$ by time (phase) TP31 by the sensor SN1.

Also, as shown in FIG. 6, the laser beams $L_1$ to $L_N$ are detected by the sensor SN2 at the position at which the sensor SN2 is arranged, and in a state in which the phases are mutually shifted by an amount corresponding to SL2 in the main scanning direction. Note that SL2 corresponds to a phase shift of a different amount than SL1, due to the difference in the refractive index in the main scanning direction of the lens through which the laser beams pass as described above. The passage times TP12, TP22, and TP32 of the region between the sensors SN1 and SN2 are measured respectively for the laser beams $L_1$ to $L_3$ based on the result of the sensors SN1 and SN2 detecting the laser beams $L_1$ to $L_3$.

Similarly, the times TP13, 23, and 33 for passing through the region between the sensors SN2 and SN3, the times TP14, 24, and 34 for passing through the region between the sensors SN3 and SN4, and the times TP15, 25, and 35 for passing through the region between the sensors SN4 and SN5 are measured for the laser beams $L_1$ to $L_3$ based on the result of the sensors SN3 to SN5 detecting the laser beams $L_1$ to $L_3$. Based on the times TP12 to 35 measured based on the results of the sensors SN1 to SN5 detecting the laser beams $L_1$ to $L_N$, the positions at which the pixels are to be formed by the laser beams $L_1$ to $L_N$ in the regions in the main scanning direction can be identified.

Figure 7A:
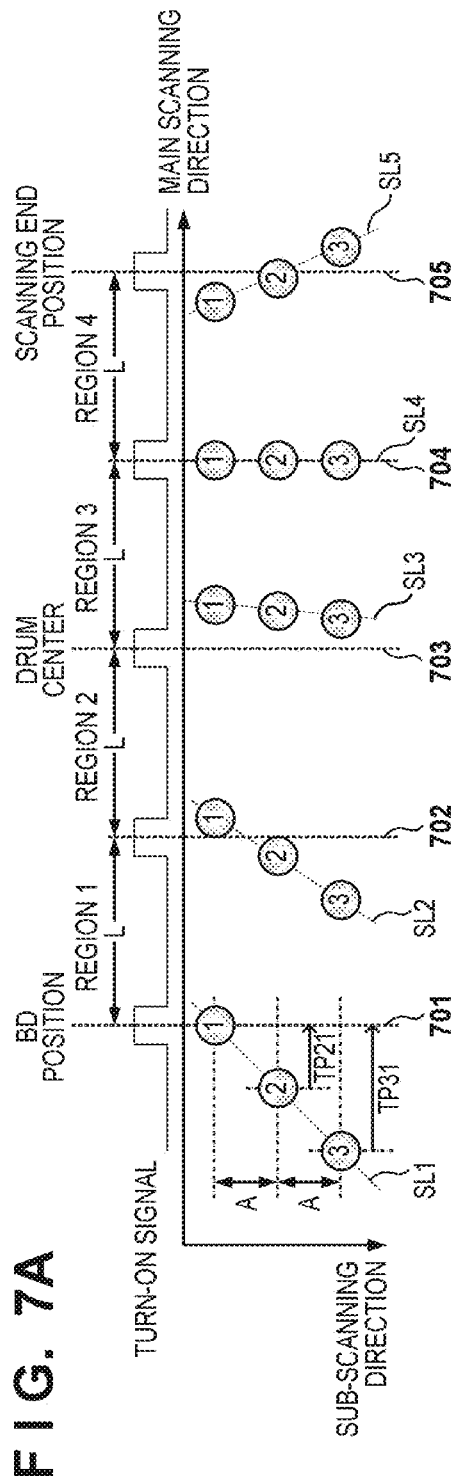
FIGS. 7A to 7C are diagrams showing an example of correction of the writing start positions of pixels in the main scanning direction, and correction of partial magnification at regions in the main scanning direction.
Figure 7B:
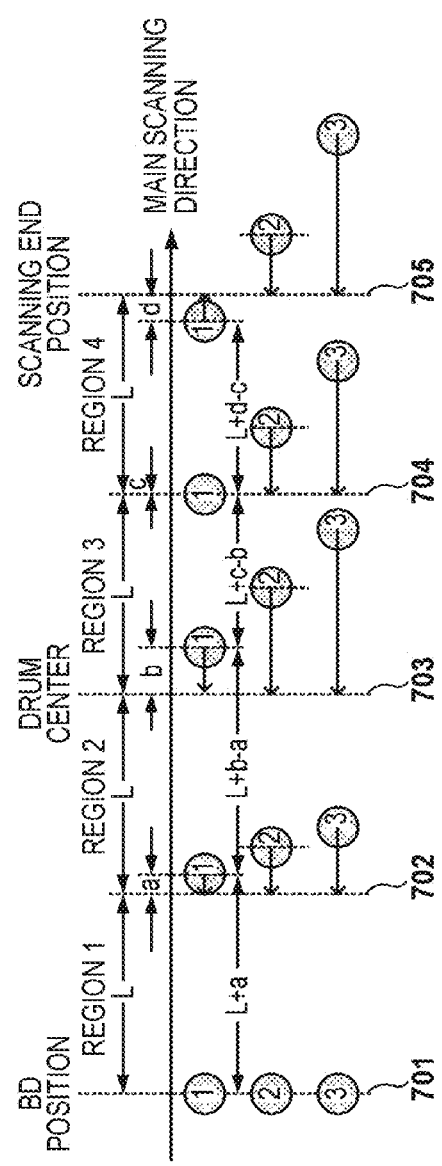
Figure 7C:
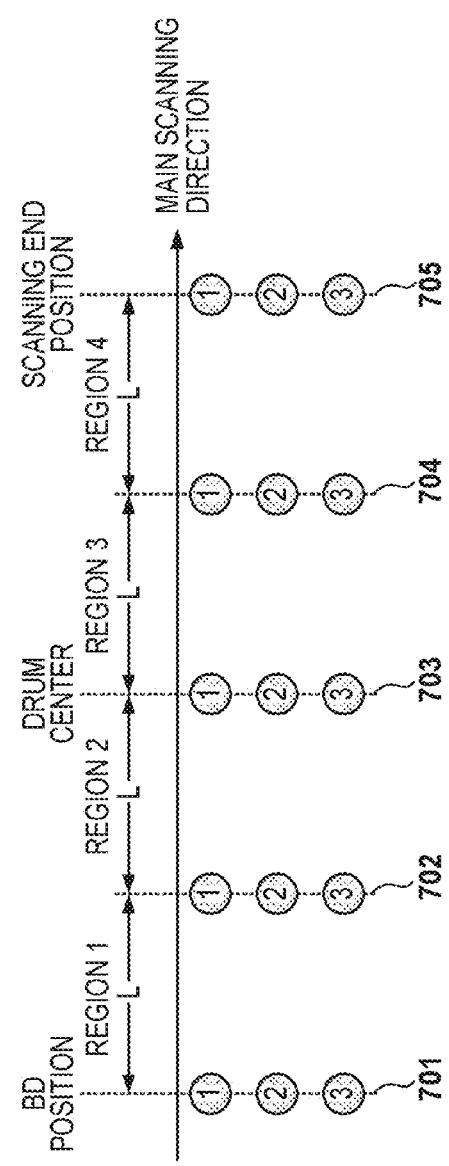

FIGS. 7A to 7C are diagrams for describing correction of the writing start positions of pixels in the main scanning direction and correction of the partial magnification in regions in the main scanning direction, which are performed based on the measurement results shown in FIG. 6. Note that in FIGS. 7A to 7C, the entire scanning region in the main scanning direction is divided into regions 1 to 4 of length L, using the positions 701 to 705 of the sensors SN1 to SN5 shown in FIG. 6 as the boundaries.

FIG. 7A shows positions (image formation positions $S_1$ to $S_3$) at which pixels are formed by the laser beams $L_1$ to $L_3$ based on the result of measuring the times TP12 to 35 using the sensors SN1 to SN5, shown in FIG. 6. Note that FIG. 7A shows the positions at which pixels are formed by the laser beams at an ideal timing at which the laser beam $L_1$ passes through the positions 701 to 705. That is to say, the positions 701 to 705 are equivalent to positions that are ideal for positions at which pixels are formed by the laser beams $L_1$ to $L_3$.

As shown in FIG. 7A, a phase difference corresponding to SL1 appears in the laser beams $L_1$ to $L_3$ at the BD position (position 701). Also, in the regions 1 to 4, the interval in the main scanning direction between the pixels corresponding to the positions 702 to 705 (ideal positions) differ for each laser beam due to the pixels being formed in a state in which phase differences corresponding to SL2 to SL5 have occurred in the laser beams $L_1$ to $L_3$. That is to say, it is understood that the pixels are formed using different magnifications for each laser beam in the respective regions 1 to 4.

Correction of Writing Start Positions of Pixels

FIG. 7B shows positions (image formation positions $S_1$ to $S_3$) at which pixels are formed by the laser beams $L_1$ to $L_3$ in the case where the writing start positions of the pixels in the main scanning direction at the BD position (position 701) have been corrected (i.e., in the case where the phases of the laser beams $L_1$ to $L_3$ have been aligned). This kind of correction of the writing start positions of the pixels can be realized by controlling the relative laser emission timings based on the image data of the light emitting elements 1 to 3 corresponding to the laser beams $L_1$ to $L_3$. Specifically, the timing of turning on the light emitting element 2 based on the image data is delayed by time TP21 with respect to the timing of turning on the light emitting element 1. Similarly, the timing of turning on the light emitting element 3 based on the image data is delayed by time TP31 with respect to the timing of turning on the light emitting element 2. As a result, as shown in FIG. 7B, the pixels are formed by the laser beams $L_1$ to $L_3$ at the BD position in a state in which the phases of the laser beams are aligned. Note that it is possible to align the phases at the BD position using similar control for laser beams other than $L_1$ to $L_3$, namely $L_4$ to $L_N$.

The delay times TP21, TP31, . . . , and TPN1, that are set in this way for the respective laser beams $L_2$ to $L_N$ are converted to count values $C_2$ to $C_N$, which will be described later. Note that the count values $C_2$ to $C_N$ are equivalent to timing values for controlling the beam emission timings of the light emitting elements 2 to N, and are set by using the count value $C_1$, which corresponds to the timing value for beam emission control of the light emitting element 1, as a reference. The count values $C_1$ to $C_N$ are stored in the memory 406. In the present embodiment, the count values $C_1$ to $C_N$ are an example of timing control data for controlling the relative emission timings of laser beams (light beams) based on image data for the multiple light emitting elements 1 to N. The count values $C_1$ to $C_N$ are used as data for causing the relative scanning positions in the main scanning direction to coincide when multiple laser beams scan the photosensitive drum 102.

Correction of Partial Magnification in the Main Scanning Direction

FIG. 7B further shows a shift in the formation positions (image formation positions) of pixels with respect to the positions 702 to 705 (ideal positions) resulting from correcting the writing start positions of the pixels in the main scanning direction at the BD position (position 701). In the present example, pixels are formed at magnifications (partial magnifications) that differ for each laser beam in the regions 1 to 4. Here, a method for determining the correction magnifications for correcting partial magnifications in the regions for each laser beam will be described.

For example, the laser beam $L_1$ forms images at positions shifted by a, b, c, and d with respect to the positions 702 to 705 (ideal positions) respectively. That is to say, in region 1, the laser beam $L_1$ scans a distance that is longer than the ideal distance L by a. For this reason, by determining the correction magnification for the laser beam $L_1$ in the region 1 to be L/(L+a), it is possible to make the scanning end position of the laser beam $L_1$ in region 1 equal to position 702 (ideal position). Also, in region 2, the laser beam $L_1$ scans a distance that is longer than the ideal distance L by (b−a). For this reason, by determining the correction magnification for the laser beam $L_1$ in the region 2 to be L/(L+b−a), it is possible to make the scanning end position of the laser beam $L_1$ in region 2 equal to position 703 (ideal position). Similarly, for regions 3 and 4, the correction magnifications are determined as L/(L+c−b) and L/(L+d−c), respectively.

By correcting the partial magnifications in the regions with the correction magnifications determined in this way, it is possible to form pixels at the ideal positions using the laser beams $L_1$ over the entirety of the scanning region. Also, the correction magnifications can be determined for the regions similarly for the laser beams other than the laser beam $L_1$, namely the laser beams $L_2$ to $L_N$.

The thus-calculated correction magnification values of the regions for the laser beams $L_1$ to $L_N$ are converted into correction magnification data for correcting the partial magnifications at the time of turning on the light emitting elements based on the image data, and are stored in the memory 406. By using this kind of correction magnification data, as shown in FIG. 7C, it is possible to form pixels using the laser beams $L_1$ to $L_N$ at ideal positions over the entirety of the scanning region. That is to say, it is possible to align the phases of the laser beams in the entirety of the scanning region in the main scanning direction.

Note that it is possible to use a known method in the correction of the partial magnifications. For example, a number of clock signals corresponding to the correction magnification of a region is added or subtracted to/from clock signals obtained by multiplying image clock signals so that pixels are formed, whereby it is possible to realize partial magnification correction.

Phase Shift Correction Based on Phase Shift Characteristic

If the relative positional relationship of the image forming positions $S_1$ to $S_N$ is constant during image formation, it is possible to align the writing start positions, for the laser beams $L_1$ to $L_N$, of the pixels (electrostatic latent images) in the main scanning direction by using $C_1$ to $C_N$ described above. Also, by using the above-described correction magnification data, it is possible to align the phases of the laser beams in the entirety of the scanning region in the main scanning direction.

However, when the light emitting elements emit laser beams, the wavelengths of the laser beams output from the light emitting elements change along with an increase in the temperature of the light emitting elements themselves. Also, due to the heat generated by the motor 407 when rotating the polygon mirror 204, the overall temperature of the optical scanning apparatus 104 increases and the optical characteristics (refractive index, etc.) of the scanning lenses 205 and 206 and the like change. As a result, the light paths of the laser beams emitted from the light emitting elements vary, and then the scanning states of the multiple laser beams $L_1$ to $L_N$ on the photosensitive drum 102 change. Specifically, a shift occurs in the relative scanning positions in the main scanning direction when the relative positional relationship of the image formation positions $S_1$ to $S_N$ changes, or in other words, when the multiple laser beams $L_1$ to $L_N$ scan the photosensitive drum 102. This means that a position shift (phase shift) in the main scanning direction appears in the electrostatic latent image formed by the laser beams. Even if the correction of the writing start positions of the laser beams $L_1$ to $L_N$ for the pixels in the main scanning direction (laser beam phase correction) and the correction of partial magnification in the main scanning direction are performed as described above, this kind of phase shift occurs due to temperature change in the optical scanning apparatus 104.

Figure 8A:
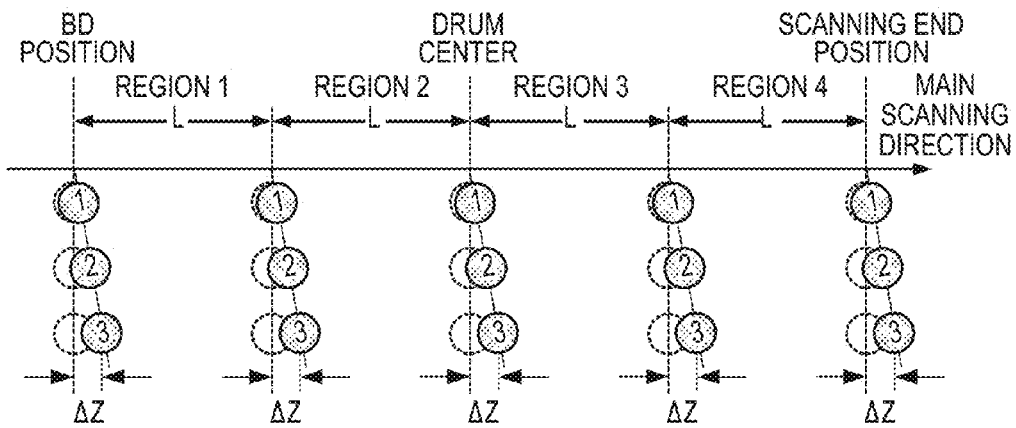
FIGS. 8A to 8C are diagrams for describing a phase shift correction based on a phase shift characteristic, and correction error that occurs in correction of a phase shift due to relative positions.
Figure 9A:
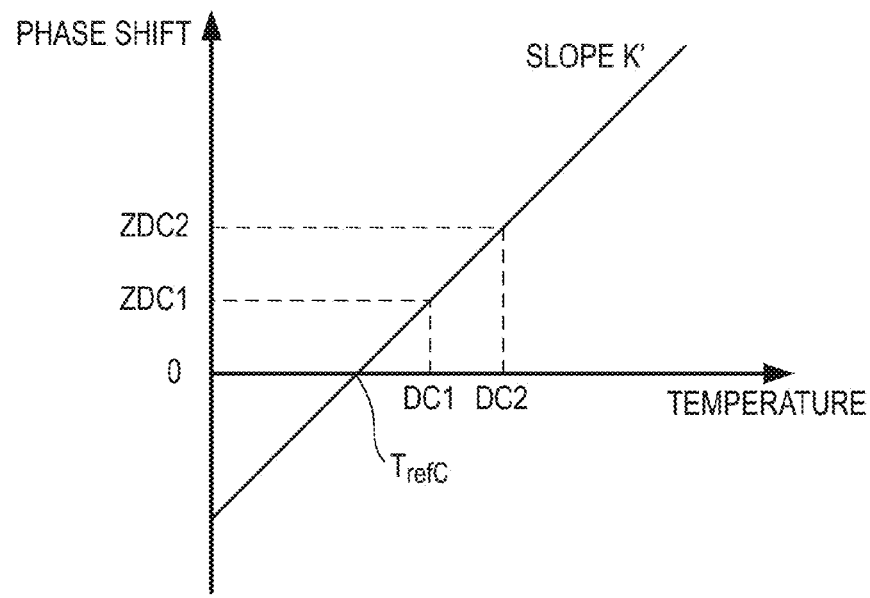
FIGS. 9A and 9B are diagrams showing an example of a relationship between the temperature or BD interval of an image forming apparatus (optical scanning apparatus) and a phase shift that appears in multiple laser beams.

FIG. 8A shows an example of a phase shift that occurs in the laser beams $L_1$ to $L_N$ due to temperature change in the optical scanning apparatus 104. This kind of phase shift occurs almost uniformly in the entirety of the scanning region, regardless of the position in the main scanning direction. As shown in FIG. 8A, if the phase shift between the laser beam $L_1$ and the laser beams $L_3$ is $\Delta Z$, the phase shift between the laser beam $L_1$ and the laser beam $L_2$ is $\Delta Z/2$. Basically, the phase shift $\Delta Z$ increases along with an increase in temperature, as shown in FIG. 9A. In this case, if the count values $C_1$ to $C_N$ are used directly, the writing start positions in the main scanning direction for the electrostatic latent image formed by the laser beams cannot be aligned.

Figure 8B:
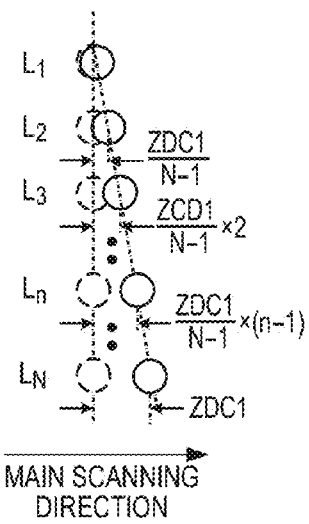

This kind of phase shift can be removed by correcting the phases of the laser beams as shown in FIG. 8B. First, as shown in FIG. 9A, the relationship between the temperature of the optical scanning apparatus 104 (image forming apparatus 100) and the phase shift that occurs in the laser beams $L_1$ to $L_N$ needs to be obtained in advance using measurement or theoretical consideration. As an example, FIG. 9A shows a relationship between the internal temperature of the optical scanning apparatus 104 and the phase shift that occurs between laser beam $L_1$ and laser beam $L_N$. FIG. 9A shows that if the temperature of the optical scanning apparatus 104 changes from $T_{refC}$ to DC1, a phase shift of ZDC1 will occur in the main scanning direction (+ direction) between laser beam $L_1$ and laser beam $L_N$. FIG. 8B shows change in the positions at which pixels (dots) are formed by the laser beams in such a case.

In FIG. 8B, if the temperature is $T_{refC}$, the positions of the dots formed by the laser beams are aligned in the main scanning direction, or in other words, the phases of the laser beams are aligned, as indicated by the dotted circles. On the other hand, if the temperature is DC1, the dots are formed in the direction (plus (+) direction) in which the phase is delayed as the laser number increases, and laser beam $L_N$ forms a dot at a position shifted by ZDC1 in the main scanning direction with respect to laser beam $L_1$, as indicated by the solid circles. This kind of phase shift can be corrected by controlling the laser emission timings such that the timing at which a dot is formed by the nth (n=1 to N) laser beam $L_n$ is ZDC1×(n−1)/(N−1) earlier (in the minus (−) direction), as shown in FIG. 8B.

This kind of correction can be realized by measuring a parameter corresponding to the scanning state of the multiple laser beams $L_1$ to $L_N$ in the main scanning direction on the photosensitive drum 102 and controlling the relative laser emission timings for the multiple light emitting elements based on the obtained parameter value. In the present embodiment, the time interval between two BD signals (BD interval) generated by the BD sensor 207 in response to the laser beams $L_1$ and $L_N$ emitted from the light emitting elements 1 and N (first and second light emitting elements) is used as the parameter corresponding to the scanning state of the multiple laser beams $L_1$ and $L_N$. Note that in a later-described third embodiment, the internal temperature of the image forming apparatus 100 (optical scanning apparatus 104) is used as this kind of parameter instead of the BD interval.

In the present embodiment, an example will be described in which two BD signals are generated based on laser beams emitted from two light emitting elements among multiple light emitting elements ($LD_1$ to $LD_N$) and this kind of laser emission timing control is executed using these BD signals. Specifically, the image forming apparatus 100 (CPU 401) causes two BD signals to be generated by causing laser beams emitted from light emitting elements 1 and N ($LD_1$, $LD_N$) to be detected by the BD sensor 207. Furthermore, as described below, the image forming apparatus 100 (CPU 401) controls the relative laser emission timings for the multiple light emitting elements based on the difference between the times at which the BD sensor 207 generates the two BD signals (i.e., the difference between the laser beam detection times).

Figure 9B:
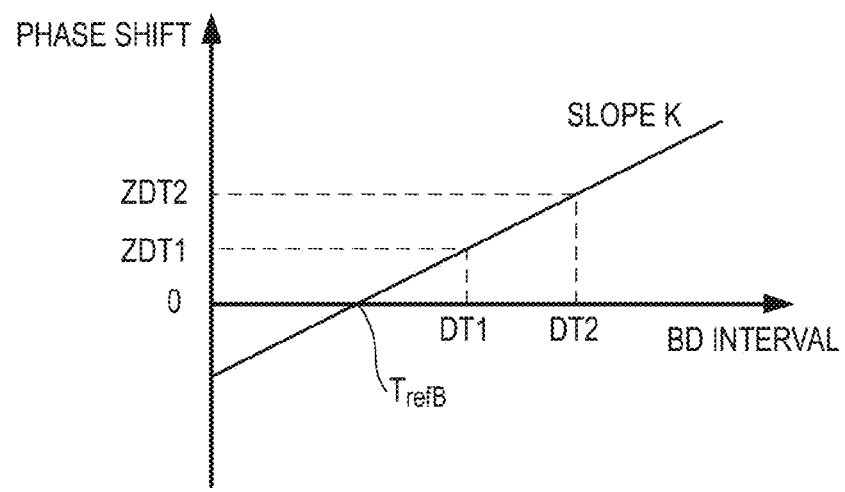

FIG. 9B is a diagram showing an example of a relationship between the time interval between two BD signals (BD interval) that are output from the BD sensor 207 and correspond to the laser beams $L_1$ and $L_N$, and the phase difference (phase shift) between laser beams in the main scanning direction corresponding to the image formation positions $S_1$ and $S_N$ on the photosensitive drum 102. As shown in FIG. 9B, the change in the phase shift on the photosensitive drum 102 with respect to the change in the BD interval on the BD sensor 207 indicates a linear characteristic with slope K, and is a characteristic that is almost the same in the entirety of the scanning region, regardless of the position in the main scanning direction. In the present embodiment, the characteristic shown in FIG. 9B (phase shift characteristic) is an example of a correction characteristic indicating the relationship between the BD interval and the phase shift in the multiple laser beams corresponding to the shift in the relative scanning positions in the main scanning direction at the time when the multiple laser beams scan the photosensitive drum 102.

Here, a coefficient K is a coefficient for performing weighting with respect to the amount of change from the reference values (later-described $C_{DT}-C_{ref}$) for the time interval between the two BD signals (BD interval) corresponding to the time interval for the BD sensor 207 detecting the two laser beams. Coefficient K is determined according to the characteristics of the optical system. Specifically, the coefficient K is equivalent to the ratio of change in the phase shift in the main scanning direction corresponding to the image formation positions of the two laser beams on the photosensitive drum 102, with respect to change in the BD interval when the photosensitive drum 102 is scanned by the two laser beams emitted from the two light emitting elements.

For example, in an optical system in which the scanning speed on the BD sensor 207 is equal to the scanning speed on the photosensitive drum 102 at the time of the two laser beams scanning the photosensitive drum 102, the coefficient K is determined as K=1. On the other hand, in an optical system in which the scanning speed on the BD sensor 207 and the scanning speed on the photosensitive drum 102 are different at the time of the two laser beams scanning the photosensitive drum 102, the coefficient K is determined as the ratio between the amount of change in the BD interval and the amount of change in the phase shift on the photosensitive drum 102.

The optical scanning apparatus 104 of the present embodiment has the optical system shown in FIG. 2, in which the coefficient K is determined as not being 1 (K≠1). In the optical scanning apparatus 104, after passing through the scanning lens 205, the laser beams are reflected by the reflection mirror 208 and form images on the light receiving surface 207a of the BD sensor 207 via the BD lens 209. In this case, the laser beams that scan the BD sensor 207 pass through the BD lens 209, whereas the laser beams that scan the photosensitive drum 102 pass through the scanning lens 206. In this way, when laser beams are to scan scanning targets via independent lenses, the scanning speed on the BD sensor 207 and the scanning speed on the photosensitive drum 102 can be different speeds depending on the relationship between the magnification of the lens and the distance of the focal point from the lens. In this case, the coefficient K is not 1 (K≠1).

Note that in an optical system other than the optical system shown in FIG. 2 as well, there is a possibility that the scanning speed on the BD sensor 207 and the scanning speed on the photosensitive drum 102 will be different due to errors in attaching the optical components in the assembly step, or the like. In such a case, the coefficient K may be determined experimentally using the optical system. Also, the coefficient K may be derived and determined for each image forming apparatus (optical scanning apparatus) at the time of factory adjustment. Note that the coefficient K may be determined by, for example, changing the temperature of the measuring environment and deriving the scanning speed on the BD sensor 207 and the scanning speed on the photosensitive drum 102 before and after the temperature change.

Also, $T_{refB}$, which is the BD interval corresponding to a point of intersection with the X axis in the phase shift characteristic shown in FIG. 9B, is a BD interval that is used as a reference for aligning the phases of the laser beams in the entirety of the scanning region in the main scanning direction. If the BD interval measured using the BD sensor 207 is $T_{refB}$, the phase shift will be 0, which indicates that the phases of the lasers are aligned in the entirety of the scanning region in the main scanning direction.

The above-described coefficient (slope) K and the reference count value $C_{refB}$, into which the BD interval $T_{refB}$ used as a reference is converted, are stored in the memory 406.

Phase Shift Correction Based on Phase Shift Characteristic

Figure 5:
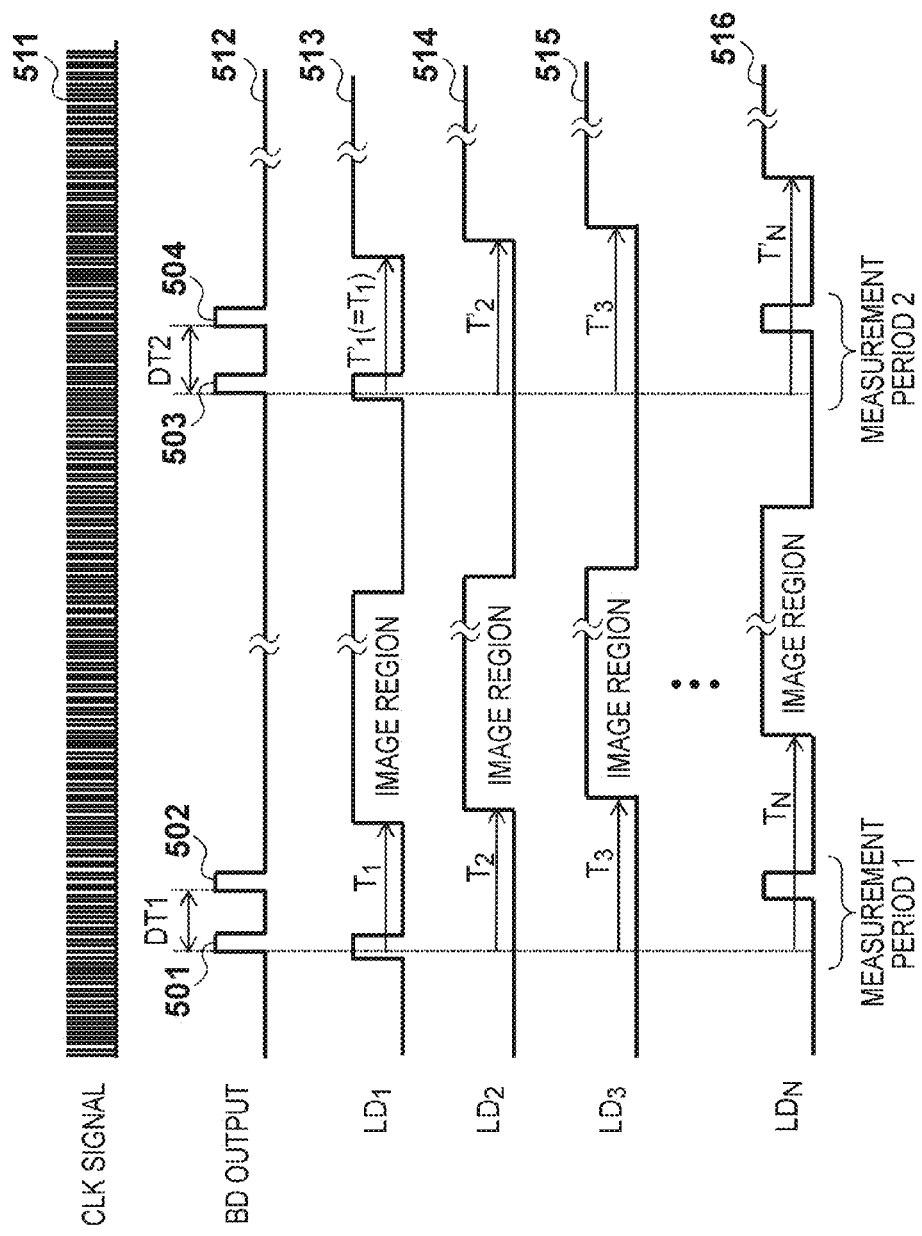
FIG. 5 is a timing chart showing an example of the timings of operations performed by the optical scanning apparatus.

Next, laser beam phase correction (phase shift correction) using a phase shift characteristic such as that described above (FIG. 9B) will be described in detail with reference to FIG. 5. FIG. 5 is a timing chart showing the timing of operations performed by the optical scanning apparatus 104 (image forming apparatus 100) according to the present embodiment. FIG. 5 shows a CLK signal 511, an output signal 512 of the BD sensor 207, and light powers 513 to 516 of laser beams emitted by the light emitting elements 1, 2, 3, and N. Note that FIG. 5 shows the timings at which laser beams are emitted by the light emitting elements 1 to N and the timing at which BD signals are output by the BD sensor 207, when BD interval measurement is executed.

In FIG. 5, BD interval measurement using the light emitting elements 1 and N is performed in measurement periods 1 and 2. In the measurement periods, the CPU 401 controls the laser driver 403 such that the laser beams are emitted at a predetermined time interval from the light emitting elements 1 and N that are used in the measurement. Note that in the present embodiment, a case is envisioned in which BD interval measurement is executed once in one scanning cycle of the laser beams.

Specifically, the CPU 401 controls the laser driver 403 to emit the laser beams in sequence from the light emitting elements 1 and N (first and second light emitting elements) among the light emitting elements (light emitting elements 1 to N) at the predetermined time interval. Accordingly, in the measurement period 1, BD signals 501 and 502 that correspond to the light emitting elements 1 and N respectively are generated by the BD sensor 207 and output to the CPU 401 and the laser driver 403. Also, in the measurement period 2, BD signals 503 and 504 that correspond to the light emitting elements 1 and N respectively are generated by the BD sensor 207 and output to the CPU 401 and the laser driver 403. The CPU 401 measures a time interval (generation time difference) DT1 between the BD signal 501 and the BD signal 502 in the measurement period 1, and measures the time interval DT2 between the BD signal 503 and the BD signal 504 in the measurement period 2, as count values $C_{DT}$ based on the counter 402.

In the measurement period 1, in response to the BD signal 501 being input from the BD sensor 207, the CPU 401 starts counting the CLK signals 511. Subsequently, in response to the BD signal 502 being input from the BD sensor 207, the CPU 401 stops counting the CLK signals 511 and generates a count value $C_{DT}$. The count value $C_{DT}$ is a value indicating the time interval DT1 between the BD signal 501 and the BD signal 502, shown in FIG. 5. Note that in the measurement period 2 as well, the CPU 401 similarly generates the count value $C_{DT}$ indicating the time interval DT2 between the BD signal 503 and the BD signal 504.

A beam emission timing control method using the beam interval measurement result will be described next. In the present embodiment, reference values that are to be used as a reference for the beam emission timing control for the light emitting elements, and timing values that are set in association with the reference value and indicate the laser emission timings for the light emitting elements are stored in advance in the memory 406, as described above. In the laser emission timing control, for each of the light emitting elements 1 to N, the laser emission timing is adjusted using a value obtained by correcting the timing value according to the difference between the BD interval measurement result and the reference value stored in the memory 406.

In the present embodiment, the reference count value $C_{refB}$ is stored in the memory 406 as a reference value for controlling the timing according to which the light emitting elements emit beams. Also, the count values $C_1$ to $C_N$ for the light emitting elements 1 to N, which are in association with the reference count value $C_{refB}$, are stored in the memory 406 as timing values for controlling the timings at which the light emitting elements emit beams. Note that the count values $C_1$ to $C_N$ correspond to $T_1$ to $T_N$ respectively, which are shown in FIG. 5.

(Case in which $C_{DT}=C_{refB}$)

Control for the laser emission timings of the light emitting elements ($LD_n$) based on the count value $C_{DT}$ obtained by the above-described measurement will be described next. It is assumed that the count value $C_{DT}$ obtained by measurement in the measurement period 1 shown in FIG. 5 is equal to the reference count value $C_{refB}$, which is stored in advance in the memory 406. This means that the measurement result DT1 for the time interval between the BD signals 501 and 502 indicated by the count value $C_{DT}$ is equal to the reference value $T_{refB}$ (DT1=$T_{refB}$). In this case, the phase shift is 0 according to the phase shift characteristic shown in FIG. 9B, and phase correction of the laser beams is not needed. For this reason, the count values $C_1$ to $C_N$ that were stored in advance in the memory 406 are directly used to control the laser emission timings of the light emitting elements, and it is thereby possible to make the image writing start positions for the laser beams coincide with each other (i.e., to align the phases of the laser beams).

The CPU 401 controls the laser driver 403 such that the light emitting elements 1 to N ($LD_1$ to $LD_N$) are to be turned on (emit light) in sequence at the emission timings corresponding to the count values $C_1$ to $C_N$ by using, as a reference timing, the timing at which the BD signal 501 is generated. Here, $T_1$ to $T_N$ shown in FIG. 5 are amounts of time corresponding to the count values $C_1$ to $C_N$. The CPU 401 starts counting the CLK signals from the timing at which the BD signal 501 is generated and turns on the light emitting element 1 in response to the count value reaching $C_1$ (when $T_1$ has elapsed). Next, the CPU 401 turns on the light emitting element 2 in response to the count value reaching $C_2$ (when $T_2$ has elapsed). The CPU 401 performs similar control with respect to the other light emitting elements as well, and finally turns on the light emitting element N in response to the count value reaching $C_N$ (when $T_N$ has elapsed).

In this manner, the CPU 401 adjusts the laser emission timings of the light emitting elements 1 to N such that the positions at which the forming of the electrostatic latent images starts coincide with each other between the multiple main scanning lines on the photosensitive drum 102 that are scanned by the light emitting elements 1 to N. According to this, the writing start positions, in the main scanning direction, for the images to be formed by the laser beams emitted from the light emitting elements 1 to N can be caused to coincide with each other.

Here, it is possible to store only the count values $C_1$ and $C_N$ that correspond to the light emitting elements 1 and N as timing values in the memory 406. That is to say, the count values $C_2$ to $C_{N-1}$ corresponding to light emitting elements n ($2 \leq n \leq N-1$), which are positioned between the light emitting element 1 and the light emitting element N shown in FIG. 3A, may be obtained based on Equation (1) below rather than being stored in the memory 406. Specifically, the CPU 401 may calculate the count value Cn for controlling the laser emission timing for the light emitting element n ($2 \leq n \leq N-1$) such that:

$$C_n = C_1 + (C_N - C_1) \times (n-1)/(N-1) \qquad (1)$$
$$= C_1 \times (N-n)/(N-1) + C_N \times (n-1)/(N-1)$$

For example, in the case where the light source 201 includes four light emitting elements 1 to 4 ($LD_1$ to $LD_4$), the CPU 401 calculates count values $C_2$ and $C_3$ that correspond to the light emitting elements 2 and 3 based on the following equation.

$$C_2 = C_1 + (C_4 - C_1) \times 1/3 = C_1 \times 2/3 + C_4 \times 1/3 \qquad (2)$$

$$C_3 = C_1 + (C_4 - C_1) \times 2/3 = C_1 \times 1/3 + C_4 \times 2/3 \qquad (3)$$

Thus, the laser emission timings for the light emitting elements may be determined by performing an interpolation calculation based on the count values $C_1$ and $C_N$ ($T_1$ and $T_N$) that correspond to the light emitting elements 1 and N, such that the laser emission timings of the light emitting elements 1 to N have equal time intervals therebetween.

(Case in which $C_{DT} \neq C_{refB}$)

Next, it is presumed that a deviation from the reference count value $C_{refB}$ that was stored in advance in the memory 406 has occurred in the count value $C_{DT}$ obtained by the measurement in the measurement period 2 shown in FIG. 5. This means that the measurement result DT2 for the time interval between the BD signals 503 and 504 indicated by the count value $C_{DT}$ is not equal to the reference $T_{refB}$ (DT2 $\neq T_{refB}$). In this case, since the phase shift is not 0 according to the phase shift characteristic shown in FIG. 9B, phase correction of the laser beams is needed. For this reason, the CPU 401 corrects the count values $C_1$ to $C_N$ based on the difference between the count value $C_{DT}$ and the reference count value $C_{refB}$, thereby deriving the count values $C'_1$ to $C'_N$ for controlling the laser emission timings of the light emitting elements. By controlling the laser emission timings of the light emitting elements using the derived count values $C'_1$ to $C'_N$, it is possible to make the image writing start positions for the laser beams coincide with each other.

Specifically, the CPU 401 first sets the count value $C_1$ stored in the memory 406 to the count value $C'_1$ for controlling the laser emission timing of the light emitting element 1 ($T'_1 = T_1$). Note that $T'_1$ to $T'_N$ shown in FIG. 5 are times corresponding to the count values $C'_1$ to $C'_N$ respectively. Next, the CPU 401 uses the following equation to correct $C_N$ based on the difference between the count value $C_{DT}$ and the reference count value $C_{refB}$, and thereby sets the count value $C'_N$ ($T'_N$) for controlling the laser output timing of the light emitting element N.

$$C'_N = C_N + K(C_{DT} - C_{refB}) \qquad (4)$$

Next, the CPU 401 may use an interpolation calculation based on Equations (1) to (3) to determine the count values $C'_n$ for controlling the laser emission timings of the light emitting elements n ($2 \leq n \leq N-1$) that are other than the light emitting elements 1 and N. That is to say, the CPU 401 performs an interpolation calculation based on the count values $C'_1$ and $C'_N$ ($T'_1$ and $T'_N$) set for the light emitting elements 1 and N, such that the laser emission times of the light emitting elements 1 to N have equal time intervals. According to this, the corrected laser emission timings $C'_n$ ($T'_n$) may be set for the light emitting elements 2 to (N-1).

Thereafter, the CPU 401 controls the laser driver 403 such that the light emitting elements 1 to N ($LD_1$ to $LD_N$) are to be turned on in sequence at the emission timings corresponding to the count values $C_1$ to $C_N$ by using, a reference timing, the timing at which the BD signal 503 is generated. Here, $T'_1$ to $T'_N$ shown in FIG. 5 are amounts of time corresponding to the count values $C'_1$ to $C'_N$. The CPU 401 starts counting the CLK signals from the timing at which the BD signal 501 is generated, and turns on the light emitting element 1 in response to the count value reaching $C'_1$ (when $T'_1$ has elapsed). Next, the CPU 401 turns on the light emitting element 2 in response to the count value reaching $C'_2$ (when $T'_2$ has elapsed). The CPU 401 performs similar control for the other light emitting elements as well, and finally turns on the light emitting element N in response to the count value reaching $C'_N$ (when $T'_N$ has elapsed).

In this way, the CPU 401 adjusts the laser emission timings of the light emitting elements 1 to N such that the positions at which the forming of the electrostatic latent images starts coincide with each other between the multiple main scanning lines on the photosensitive drum 102 that are scanned by the light emitting elements 1 to N. According to this, even when the measured value for the time interval between the BD signals changes from the reference value, the writing start positions for the images to be formed by the laser beams emitted from the light emitting elements 1 to N can be caused to coincide with each other in the main scanning direction.

Image Formation Processing Performed by the Image Forming Apparatus

Figure 10:
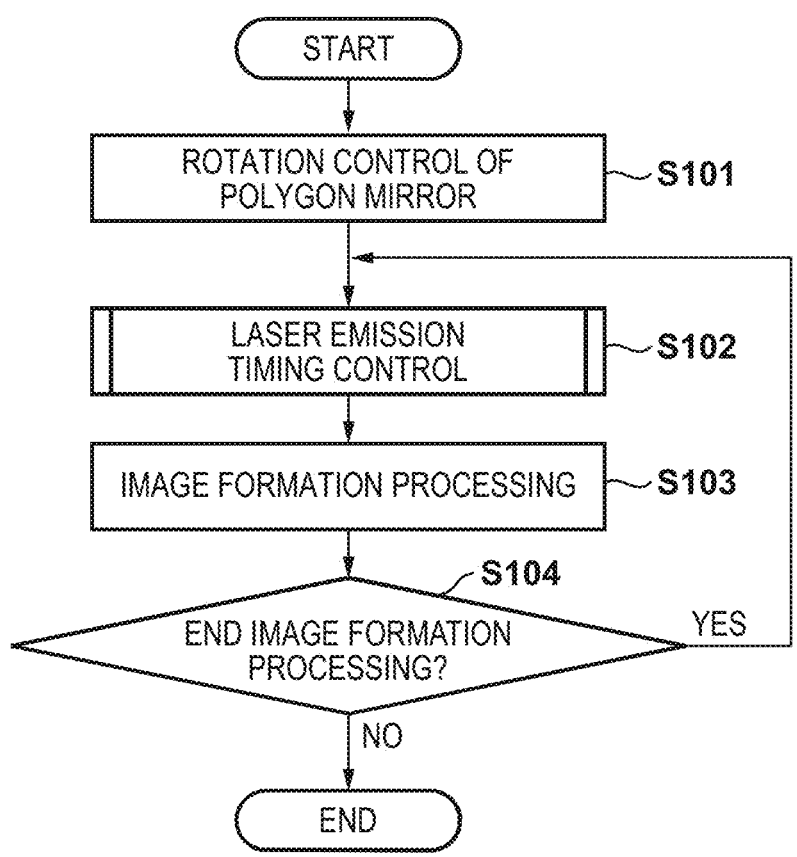
FIG. 10 is a flowchart showing a procedure of image formation processing according to first to third embodiments.

FIG. 10 is a flowchart showing a procedure of image formation processing executed by the image forming apparatus 100 according to the present embodiment. The processing of the steps shown in FIG. 10 is realized in the image forming apparatus 100 by the CPU 401 reading out a control program stored in the memory 406 and executing it. The processing of step S101 starts in response to image data being input to the image forming apparatus 100.

In step S101, in response to the input of the image data, the CPU 401 starts the driving of the motor 407, thereby starting rotation control of the polygon mirror 204. In step S101, the CPU 401 controls the rotation speed of the polygon mirror 204 so that the rotation speed of the polygon mirror 204 reaches a predetermined rotation speed. When the rotation speed of the polygon mirror 204 reaches the predetermined rotation speed, the CPU 401 advances the processing to step S102. In step S102, the CPU 401 executes laser emission timing control for the light emitting elements 1 to N in accordance with the procedure shown in FIG. 11 (steps S111 to S122).

In step S111, the CPU 401 causes the laser driver 403 to turn on the light emitting element 1. Subsequently, in step S112, based on the output from the BD sensor 207, the CPU 401 determines whether or not a BD signal has been generated according to the laser beam emitted from the light emitting element 1. As long as it is determined in step S112 that a BD signal has not been generated, the CPU 401 repeats the determination processing of step S112, and upon determining that a BD signal has been generated, the CPU 401 advances the processing to step S113. In response to the generation of the BD signal, the CPU 401 starts counting the CLK signals using the counter in step S113 and causes the laser driver 403 to turn off the light emitting element 1 in step S114.

Next, in step S115, the CPU 401 causes the laser driver 403 to turn on the light emitting element N. Subsequently, based on the output from the BD sensor 207, the CPU 401 determines in step S116 whether or not a BD signal has been generated according to the laser beam emitted from the light emitting element N. As long as it is determined in step S116 that a BD signal has not been generated, the CPU 401 repeats the determination processing of step S116, and upon determining that a BD signal has been generated, the CPU 401 advances the processing to step S117. In step S117, the CPU 401 generates the count value $C_{DT}$ by sampling the count value of the clock signals counted by the counter 402, and in step S118, the CPU 401 causes the laser driver 403 to turn off the light emitting element N.

Next, in step S119, the CPU 401 compares the count value $C_{DT}$ and the reference count value (reference value) $C_{refB}$ to determine whether or not $C_{DT}=C_{refB}$. If it is determined that $C_{DT}=C_{refB}$, the CPU 401 advances the processing to step S120. In step S120, as described above, based on $C_1$ to $C_N$, the CPU 401 sets the relative timings $T_1$ to $T_N$ according to which the light emitting elements emit laser beams based on the image data using, as a reference, the generation timing of the BD signal generated according to the laser beam $L_1$ emitted from the light emitting element 1. $C_{refB}$ and $C_1$ to $C_N$, which are used in steps S119 and S120, are read out from the memory 406.

On the other hand, if it is determined in step S119 that $C_{DT} \neq C_{refB}$, the CPU 401 advances the processing to step S121. In step S121, the CPU 401 calculates $C_{cor}=C_{DT}-C_{refB}$, and corrects $C_1$ to $C_N$ based on $C_{cor}$ as described above to generate $C'_1$ to $C'_N$. Furthermore, in step S122, as described above, based on $C'_1$ to $C'_N$, the CPU 401 sets the laser beam emission timings $T_1$ to $T_N$ for the light emitting elements that are based on the generation timing of the BD signal generated according to the laser beam $L_1$ emitted from the light emitting element 1.

With that, the CPU 401 ends the laser emission timing control for the light emitting elements 1 to N in step S102 and advances the processing to step S103. Returning to FIG. 10, in step S103, the CPU 401 starts image formation processing based on the input image data. Specifically, the CPU 401 executes an exposure process for exposing the photosensitive drum 102 by causing the laser beams $L_1$ to $L_N$ based on the image data to be emitted from the light emitting elements 1 to N in accordance with the laser emission timings set in step S120 or step S121. Furthermore, the CPU 401 forms an image on the recording medium S by executing other processes such as a developing process and a transfer process. Note that when the laser beams $L_1$ to $L_N$ based on the image data are to be emitted from the light emitting elements 1 to N, the CPU 401 corrects the above-described partial magnifications based on the correction magnification data stored in the memory 406.

Thereafter, in step S104, the CPU 401 determines whether or not to end image formation. For example, if a page that is an image formation target remains, the CPU 401 determines not to end image formation and return the processing back to step S102, whereas if the CPU 401 determines to end the image formation, it ends the series of processes shown in FIG. 10.

Correction of a Phase Shift Due to a Relative Position Shift

As described above, if the relative positions of the optical scanning apparatus 104 and the photosensitive drum 102 are not appropriate, there is a possibility that the phases of the laser beams $L_1$ to $L_N$ cannot be aligned even if the phase shift (phase shift due to environmental variation) is corrected based on the phase shift characteristic. This can occur due to the focus shifting when the laser beams $L_1$ to $L_N$ scan the photosensitive drum 102 in the case where the relative positions of the optical scanning apparatus 104 and the photosensitive drum 102 are not appropriate.

Figure 12A:
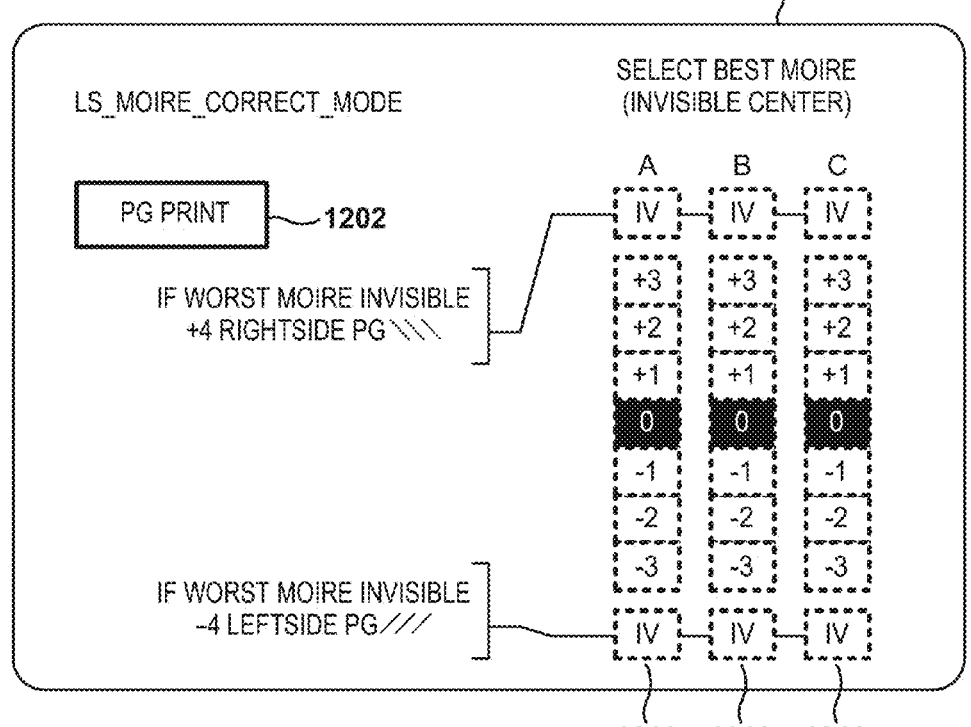
FIGS. 12A and 12B are diagrams showing an example of an operation screen for correction of a phase shift due to a relative position shift.

Here, a method for correcting a phase shift due to this kind of shift in the relative positions of the optical scanning apparatus 104 and the photosensitive drum 102 will be described with reference to FIGS. 12A, 12B, and 13. FIG. 12A shows an example of an operation screen displayed on an operation unit (not shown) of the image forming apparatus 100. The operation screen 1201 is used for receiving user input of a phase adjustment value for the laser beams to be used for correcting a phase shift due to the relative positions of the optical scanning apparatus 104 and the photosensitive drum 102. The image forming apparatus 100 uses the operation screen 1201 when outputting an image 1301 for laser beam phase adjustment (FIG. 13) and when receiving user input of a phase adjustment value for laser beams.

Figure 13:
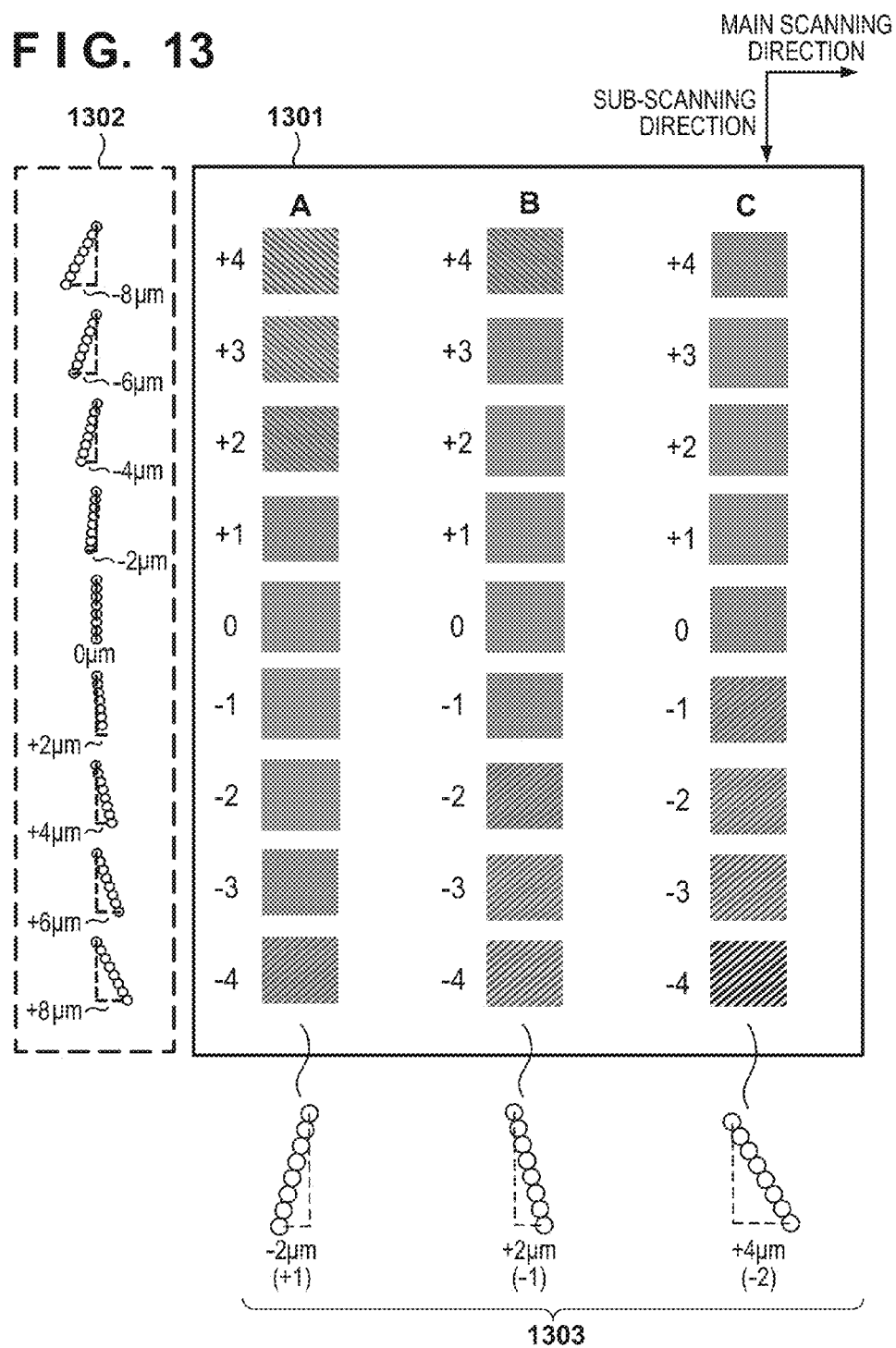
FIG. 13 is a diagram showing an example of an image for phase adjustment in correction of a phase shift due to a relative position shift.

If the user presses a button 1202 while the operation screen 1201 is displayed on the operation unit, the image forming apparatus 100 outputs the image 1301 for laser beam phase adjustment (FIG. 13). In the present embodiment, a case is described in which the image 1301 is output (printed) on a recording medium S, but as will be described in a second embodiment, it is also possible to correct a phase shift without outputting the image 1301 on the recording medium S.

As shown in FIG. 13, the image 1301 for laser beam phase adjustment has image patterns for phase adjustment, constituted by column A, column B, and column C. The images included in the image patterns are 10 mm×10 mm square-shaped HT images, and 9 of these HT images are arranged in each of column A, column B, and column C, and are denoted by identification numbers (−4 to +4). In each of column A, column B, and column C, nine 1200-dpi HT images with different laser beam phases, as indicated by reference numeral 1302, are arranged linearly in nine rows. Note that column A, column B, and column C are arranged in different regions in the main scanning direction, which makes it possible to detect phase shifts in different regions in the main scanning direction.

In the image 1301, for example, in the 0-th row, an HT image formed in a state in which there is theoretically no phase shift between the laser beams is arranged, by directly using the count values $C_1$ to $C_N$ stored in the memory 406 to cause the light emitting elements 1 to N to emit light. In addition, in the rows other than the 0-th row, namely the +1st row, +2nd row, +3rd row, +4th row, −1st row, −2nd row, −3rd row, and −4th row, HT images formed so as to generate phase shifts that change in a stepwise manner in 2-μm steps are arranged in sequence in the sub-scanning direction from the 0-th row. The formation of this kind of HT image can be realized by adjusting the laser emission timings of the light emitting elements 1 to N.

Note that one HT image is a 50% HT image, and a screen causes phase shifts in a stepwise manner in the sub-scanning direction depending on the position in the main scanning direction. For this reason, as shown in FIGS. 16A and 16B, the HT image is designed such that a high-sensitivity and highly-visible interference pattern of around 1 mm appears due to interference between periodic level differences generated on the boundaries of sub-scanning lines due to a laser phase shift.

The image data for forming the HT images included in the image 1301 is all the same. On the other hand, when forming the image 1301, the HT images are formed based on the image data in a state in which the laser emission timing is changed in a stepwise manner in the sub-scanning direction. By visually checking the image 1301 formed in this way, a user determines whether or not the interference pattern that appears due to the phase shift is observed, and inputs the setting of the correction value for the phase shift based on the result of that determination.

As described above, the HT images of the 0-th row in column A, column B, and column C are HT images that are formed in a state in which there is theoretically no phase shift between the laser beams. However, the HT images in the 0-th row are not necessarily the images with the weakest interference patterns in the columns of the output image 1301. This is because if the relative positions of the photosensitive drum 102 and the optical scanning apparatus 104 are not appropriate, a phase shift between the laser beams will occur.

Next, a method of visual determination using the output image 1301 will be described. For example, in column A, the interference pattern due to the phase shift appears intensely in the HT image in the −4-th row, and the interference patterns that appear in the HT images decrease as the numbers (numbers denoting the HT images) increase. Also, in column A, the interference pattern due to the phase shift appears intensely in the HT image in the +4-th row, and the interference patterns that appear in the HT images decrease as the numbers decrease. The user will ultimately select the HT image in the −1st row in column A, in which the interference pattern that appears is the weakest (least visible).

Here, since the intensity of the interference pattern that appears is the same level in the HT images in the −2nd row to the 0-th row, it is difficult for a user to determine the HT image with the weakest appearing interference pattern. In such a case, using the fact that interference patterns with about the same intensity are observed in the HT image of the +2nd row and the −4th row, it is possible to select the HT image in the −1st row, which is positioned in the middle between those HT images. Using this kind of determination method, the user will select the HT images with the weakest (least visible) appearing interference patterns, for not only column A but column B and column C as well.

The image 1301 shown in FIG. 13 shows an image output in the case where the relative positions of the photosensitive drum 102 and the optical scanning apparatus 104 are not appropriate (the relative positions are installed in a shifted state). According to the image 1301, it can be understood that the combination of the HT images in the −1st row, +1st row, and the +2nd row in columns A, B, and C respectively is the combination with the appearing interference pattern having the lowest intensity. From this combination, it is understood that the phase shift on the photosensitive drum 102 appears as indicated by reference numeral 1303 in FIG. 13.

Next, a method for inputting a phase adjustment value for laser beams to be used for correcting a laser beam phase shift due to a shift in the relative positions of the optical scanning apparatus 104 and the photosensitive drum 102 will be described with reference to FIGS. 12A and 12B. An operation screen 1201 shown in FIG. 12A includes a button 1202 for instructing output of the image 1301 for laser beam phase adjustment (FIG. 13) and groups of buttons 1211 to 1213 arranged in three rows. Each of the groups of buttons 1211 to 1213 includes nine selection buttons corresponding to phase adjustment values ranging between [−3] to [+3], and the user can select one of the nine selection buttons in each group of buttons. The groups of buttons 1211 to 1213 correspond to column A, column B, and column C respectively, and the nine selection buttons included in each group of buttons correspond to the HT images in the −4th row to the +4th row in FIG. 13, respectively. Note that FIGS. 12A and 12B show a state where highlighted selection buttons have been selected, and the selection buttons corresponding to [0] are highlighted for all of the groups of buttons 1211 to 1213 at the time of shipping of the image forming apparatus 100.

Figure 12B:
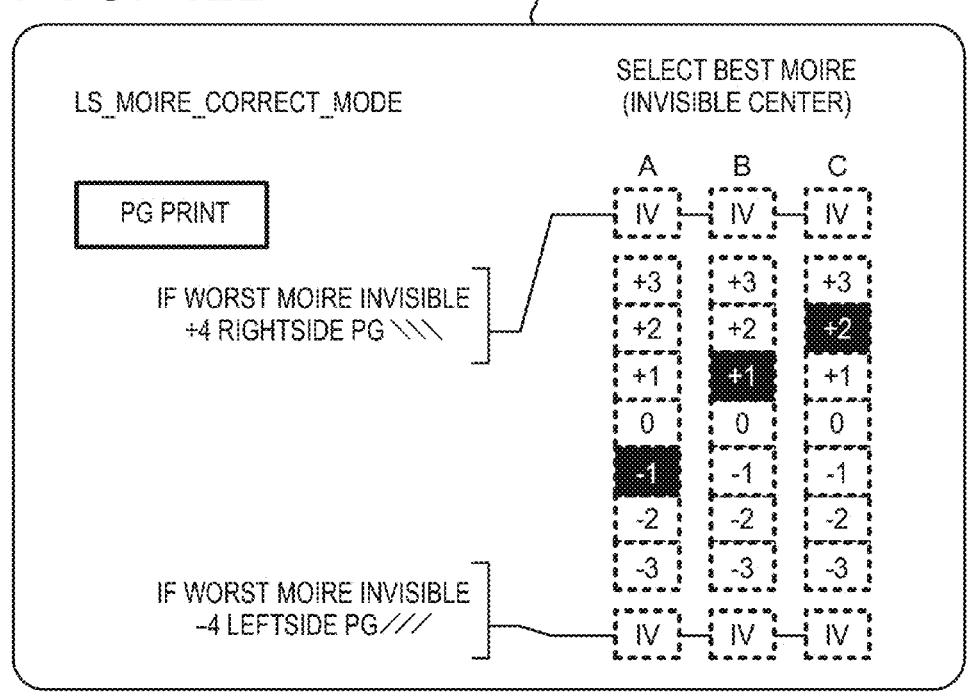

FIG. 12B shows a state in which a selection button in each of the groups of buttons 1211 to 1213 has been selected by the user. Here, the selection buttons corresponding to the HT images in the −1st row, the +1st row, and the +2nd row, which is the combination whose appearing interference pattern has the lowest intensity (reference numeral 1303 in FIG. 13), have been selected by the user in column A, column B, and column C. As shown in FIG. 12B, by selecting (pressing) a selection button in each of the groups of buttons 1211 to 1213, the user can input the corresponding phase adjustment values into the image forming apparatus 100. The image forming apparatus 100 (CPU 401) stores the phase adjustment values input via the operation screen 1201 in the memory 406, as phase adjustment values for laser beams, to be used for correcting a phase shift in the laser beams due to a shift in the relative positions of the optical scanning apparatus and the photosensitive drum.

The image forming apparatus 100 corrects a phase shift in the laser beams due to a shift in the relative position of the optical scanning apparatus and the photosensitive drum, by adjusting the phases of the laser beams $L_1$ to $L_N$ based on the phase adjustment values stored in the memory 406. In this kind of correction, laser beam phase adjustment is performed using the interference patterns of the screen, and therefore interference patterns are less likely to appear in image formation using the screen, which results in improving the quality of the image to be formed.

Here, a case is envisioned in which the environmental conditions of the image forming apparatus 100 are different at the time of correcting the phase shift due to a shift in the relative positions of the optical scanning apparatus 104 and the photosensitive drum 102, and the time of measuring the phase shift characteristic shown in FIG. 9B. In such a case, there is a possibility that the accuracy of correcting the phase shift will decrease due to phase shift components caused by environmental variation remaining after executing the correction of the phase shift due to the shift in the relative positions of the optical scanning apparatus 104 and the photosensitive drum 102 (phase shift due to relative position shift).

For example, in the environment of the temperature $T_{refC}$ shown in FIG. 9A (environment of BD interval $T_{refB}$ shown in FIG. 9B), a phase shift due to temperature change (environmental variation) in the image forming apparatus 100 does not occur in the laser beams $L_1$ to $L_N$. If correction of the phase shift due to relative position shift is performed in this environment, the phase shift due to environmental variation has no influence on the image 1301 for correction, and the phase shift in the laser beams can be corrected with great accuracy by the correction.

Figure 8C:
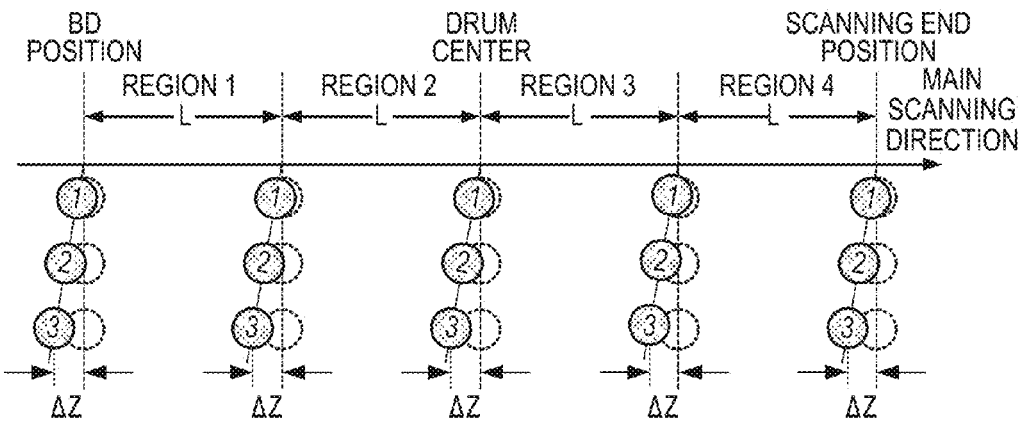

On the other hand, in the environment of the temperature DC1 shown in FIG. 9A, a phase shift ZDC1 due to temperature change (environmental variation) in the image forming apparatus 100 occurs in the laser beams $L_1$ to $L_N$. If the phase shift due to the relative position shift is corrected in this environment, the image 1301 for correction is output in a state in which the phase shift component of ZDC1 in the + direction is added, as the phase shift component due to environmental variation, to the phase shift component due to relative position shift in the entirety of the scanning region in the main scanning direction. If the phase shift due to the relative position shift is corrected based on the image 1301 in this state, as shown in FIG. 8C, a phase adjustment value is obtained which causes a phase shift in the minus (−) direction (e.g., for laser beam $L_3$, a phase shift of $\Delta Z = ZDC1 \times 2/(N-1)$). Accordingly, the image forming apparatus 100 corrects a phase shift due to relative position shift by using the phase adjustment value influenced by this kind of phase shift, and further corrects the phase shift due to environmental variation. As a result, due to the influence of this kind of phase shift, a correction error remains after correction of the phase shift due to relative position shift is executed, and it becomes more difficult to accurately correct the phase shift of the laser beams.

In view of this, in the present embodiment, when correction (first correction) of a phase shift due to relative position shift is to be executed, before the execution thereof is started, the CPU 401 executes correction (second correction) of the phase shift due to temperature change (environmental variation) in the image forming apparatus 100. That is to say, when the first correction is to be executed, the second correction is executed before the first correction is executed. Accordingly, it is possible to prevent phase shift components due to environmental variation from remaining in the data for correcting the phase shift due to the relative position shift. Furthermore, after completing the correction of the phase shift due to the environmental variation, the CPU 401 executes correction of the phase shift due to the relative position shift. As a result, it is possible to correct a phase shift in the laser beams with great accuracy by correction of a phase shift due to a relative position shift.

Procedure for Correcting a Phase Shift Due to a Relative Position Shift

Figure 14:
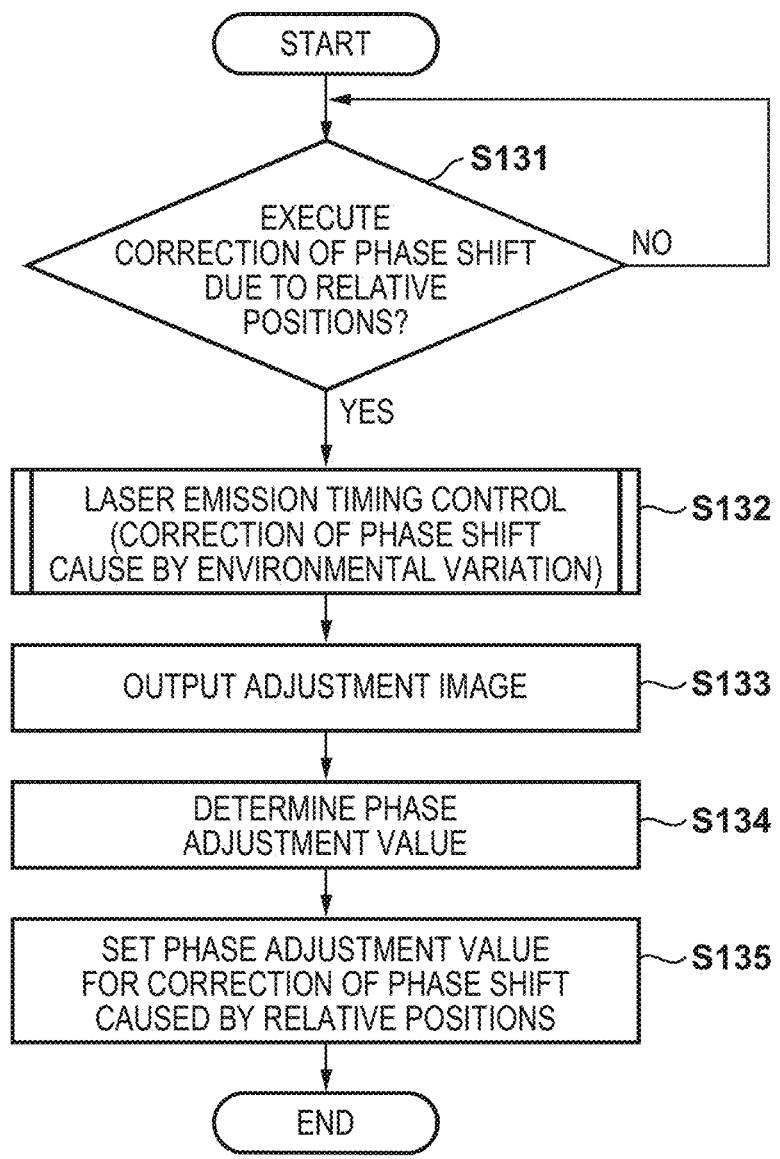
FIG. 14 is a flowchart showing a procedure of correction of a phase shift due to a relative position shift according to first to third embodiments.

FIG. 14 is a flowchart showing a procedure of correcting a phase shift due to a relative position shift (first correction) executed by the image forming apparatus 100, according to the present embodiment. The processing of the steps shown in FIG. 14 is realized in the image forming apparatus 100 by the CPU 401 reading out a control program stored in the memory 406 and executing it.

First, in step S131, the CPU 401 determines whether or not to execute correction (first correction) of the phase shift due to relative position shift. For example, in response to the button 1202 on the operation screen 1201 (FIG. 12A) being pressed by a user (i.e., an execution instruction from the user), the CPU 401 determines to execute correction of the phase shift due to relative position shift (first correction) and advances the processing to step S132.

Figure 11:
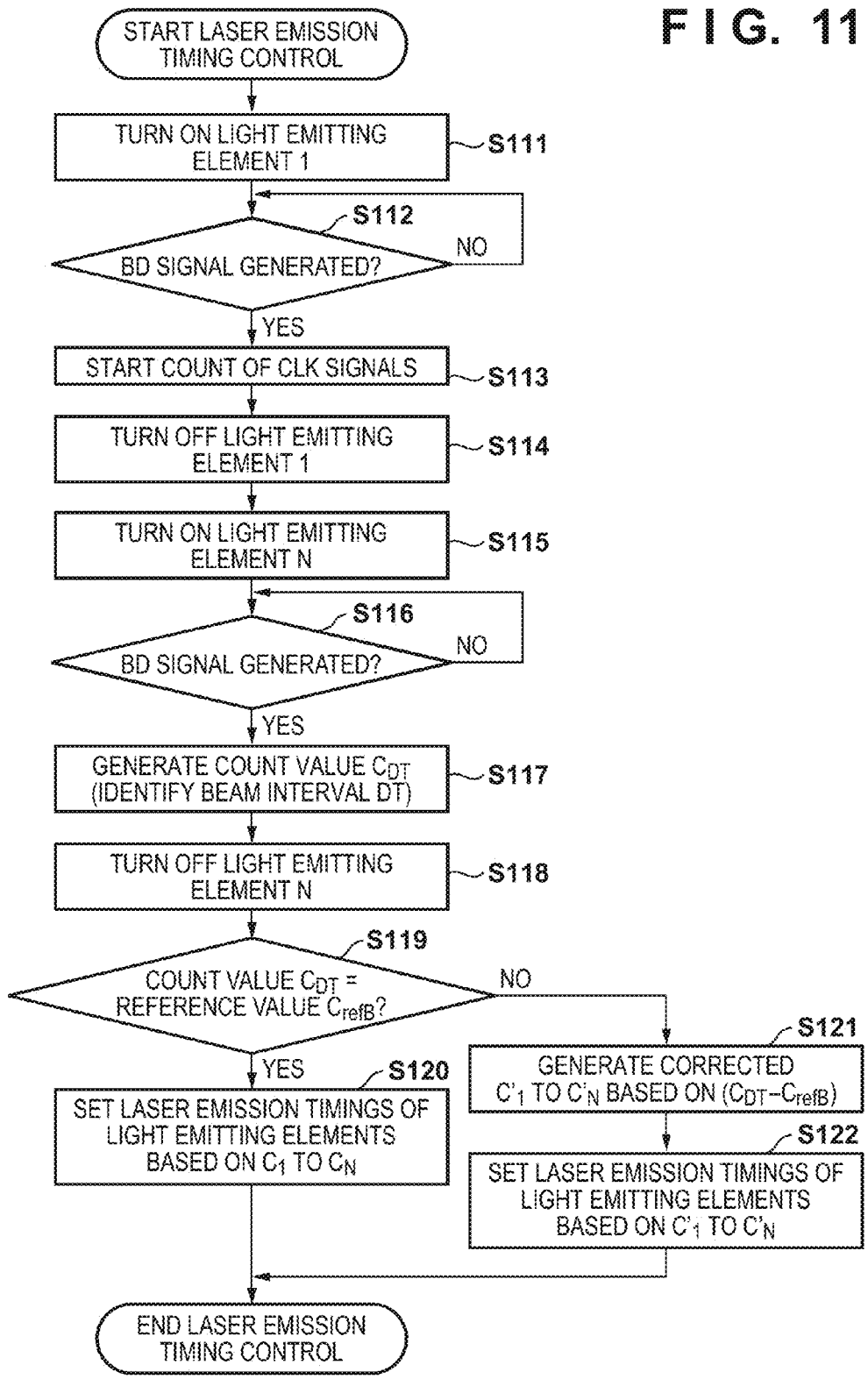
FIG. 11 is a flowchart showing a procedure of laser emission timing control (step S102) according to first and second embodiments.

In step S132, the CPU 401 executes laser emission timing control using the procedure shown in FIG. 11 as the correction (second correction) of a phase shift due to environmental variation. That is to say, in the present embodiment, using light emitting elements 1 and N, the time interval between two BD signals corresponding to the laser beams $L_1$ and $L_N$ output from the BD sensor 207 is measured. Furthermore, the laser emission timings for the light emitting elements 1 to N are set based on the measurement result (step S120 or S122). In this way, when the first correction is to be executed, the CPU 401 executes the second correction before executing the first correction.

Next, in step S133, the CPU 401 uses the laser emission timings set in step S120 or S122 to output an image for adjusting the phases of the laser beams $L_1$ to $L_N$ (correction image). In the present embodiment, the image output in step S133 is the image 1301 shown in FIG. 13, which is formed on a recording medium S and discharged to a discharge unit 116. The thus-output image for phase adjustment is an image that is not influenced by the phase shift component due to environmental variation and is influenced by only the phase shift component due to relative position shift.

Next, in step S134, the CPU 401 determines the phase adjustment value (correction data) based on the image output in step S133. In the present embodiment, as described above with reference to FIGS. 12A, 12B, and 13, the phase adjustment value is determined by receiving input of the phase adjustment values via the operation screen 1201 from the user. Note that as shown in FIGS. 12A, 12B, and 13, a phase adjustment value is determined for each of multiple regions into which the scanning region in the main scanning direction is divided.

Finally, in step S135, the CPU 401 sets the phase adjustment values determined in step S134 in the optical scanning apparatus 104 by storing them in the memory 406. Accordingly, correction of the phase shift due to relative position shift is performed in the optical scanning apparatus 104 by using the phase adjustment values stored in the memory 406. Specifically, this kind of correction can be realized by adjusting correction magnification data for correcting partial magnification and count values $C_1$ to $C_N$ (timing control data) for correcting the writing start positions, for the laser beams $L_1$ to $L_N$, of the images (pixels) in the main scanning direction using the phase adjustment values. Accordingly, image formation processing performed in accordance with the flowchart shown in FIG. 10 is executed in a state in which the phase shift due to the relative positions has been corrected with great accuracy, and it is thereby possible to execute the correction of the phase shift due to environmental variation (step S102) with great accuracy.

As described above, when performing correction (first correction) of a phase shift due to a shift in the relative positions of the optical scanning apparatus 102 and the photosensitive drum 104, the image forming apparatus 100 of the present embodiment executes correction (second correction) of a phase shift due to environmental variation before executing the first correction. This makes it possible to correct a phase shift with greater accuracy, and therefore it is possible to align the phases of the multiple laser beams that scan the photosensitive drum 102.

Second Embodiment

In the first embodiment, an example is shown in which in the correction of the phase shift due to relative position shift (FIG. 14), a phase adjustment image is output on the recording medium S in order for the user to input phase adjustment values via the operation screen 1201. In the present embodiment, an example will be shown in which correction of a phase shift due to relative position shift is performed by reading a phase adjustment image using an image sensor 120 in a state in which the image is output (formed) on the intermediate transfer belt 107 without being output on a recording medium S. Accordingly, since the image forming apparatus 100 can automatically execute correction of a phase shift due to relative position shift, the burden on the user is lightened. Note that in order to simplify the description below, the description of portions that overlap with the first embodiment will not be repeated.

An image sensor 120 is used to read the phase adjustment image 1301 shown in FIG. 13, which is formed on the intermediate transfer belt 107. The image sensor 120 is arranged at three positions at which the pattern images of column A, column B, and column C in the image 1301 can be read.

In the present embodiment, in step S133, the CPU 401 performs image formation control such that the phase adjustment image 1301 is formed on the intermediate transfer belt 107. The rotation of the intermediate transfer belt 107 causes the image (toner image) 1301 formed on the intermediate transfer belt 107 to reach a position at which it can be read by the image sensor 120. After passing the position of the image sensor 120, the image 1301 on the intermediate transfer belt 107 is removed from the intermediate transfer belt 107 by being collected by a belt cleaner and is not transferred to the recording medium S.

Figure 18:
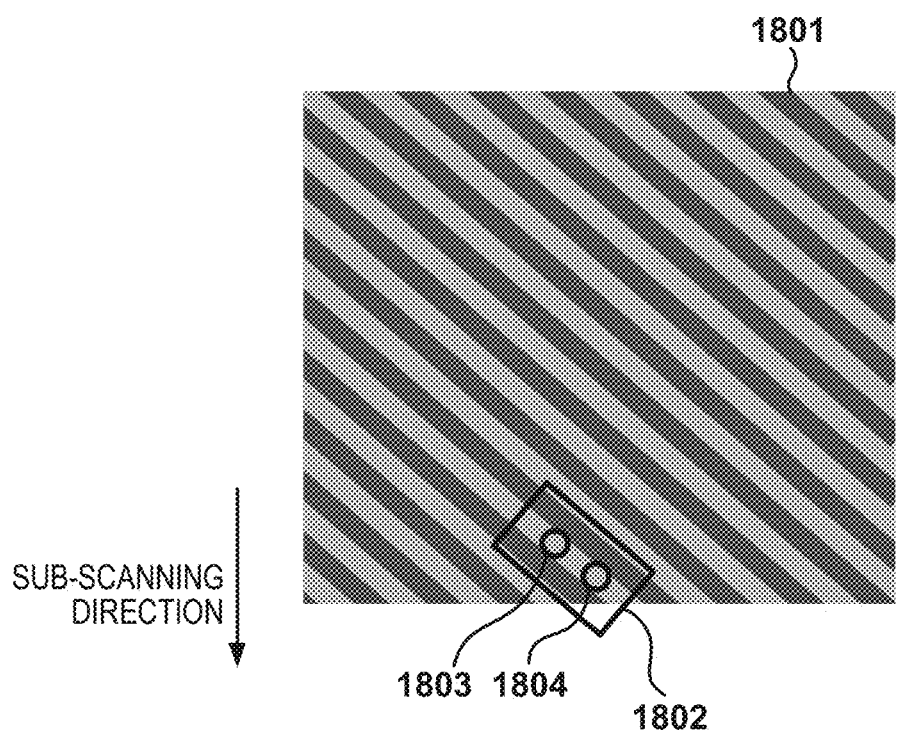
FIG. 18 is a diagram showing an example of a relationship between an HT image transferred onto an intermediate transfer belt and an image sensor.

FIG. 18 is a view of the upper surface of one HT image included in the image 1301 formed on the intermediate transfer belt 107, and shows a position 1802 at which the image sensor 120 is arranged. The image sensor 120 consists of a light projection/reflection sensor that includes one light emitting diode (LED) and two photodiodes (PD) having equivalent capabilities. FIG. 18 shows detection regions 1803 and 1804 for two PDs. The detection regions 1803 and 1804 are arranged so as to have a 45-degree slope with respect to the sub-scanning direction, and each have a diameter that is around 0.3 mm in size. Analog signals that indicate the image detection result and that are output from the two PDs are subjected to A/D conversion and are thereafter sent to the CPU 401.

The image 1301 output (formed) on the intermediate transfer belt 107 is conveyed in the sub-scanning direction according to the rotation of the intermediate transfer belt 107, and passes through the detection region for the image sensor 120. The image sensor 120 detects oscillatory waveforms by reading changes in the density of the interference patterns in the image 1301. Since the shape of the oscillatory waveform depends on the sensitivity of the image sensor 120, the spot shape of the detection region, the intensity of the interference pattern, and the like, it has a shape similar to that of a sine wave. Note that since the period of the interference pattern is significantly greater than the spot shape, the intensity of the interference patterns can be detected as the amplitude of the sine wave using both of the two PDs included in the image sensor 120. Also, the angle of the interference pattern can be detected as the amplitude of the difference between the signals output by both of the two PDs. If the angle formed by the two PDs and the angle of the interference pattern match, the amplitude of the difference will be extremely small.

In the present embodiment, in step S134, the CPU 401 determines the phase adjustment value (correction data) based on the result of the image sensor 120 detecting the image 1301. Specifically, the CPU 401 can detect the intensity and angle of the interference pattern that appears in the HT images included in the image 1301 by detecting the amplitudes of the two signal output from the two PDs of the image sensor 120 and the difference therebetween. Furthermore, based on the detection results, the CPU 401 can automatically determine the phase adjustment value (correction data) using a method similar to the determination method described with reference to FIGS. 12A, 12B, and 13 without relying on input from the user via the operation unit.

Note that in the present embodiment, an example has been described in which a light projecting/reflecting image sensor 120 is used, but the phase adjustment value (correction data) can be determined as well by providing an image reading unit in the image forming apparatus 100 and reading the image 1301 formed on the recording medium S by using the image reading unit.

Third Embodiment

In a third embodiment, as a modified example of the first embodiment, an example will be described in which the internal temperature of the image forming apparatus 100 (optical scanning apparatus 104) is used instead of the BD interval as the parameter corresponding to the scanning state of the multiple laser beams $L_1$ to $L_N$. Note that in order to simplify the description below, the description of portions that overlap with the first embodiment will not be repeated.

As described in the first embodiment, FIG. 9A shows the relationship between the internal temperature of the image forming apparatus 100 (optical scanning apparatus 104) and a phase shift in the main scanning direction that occurs between the laser beam $L_1$ and the laser beam $L_N$. The phase shift characteristic shown in FIG. 9A is obtained in advance using measurement or theoretical consideration in the step of manufacturing the optical scanning apparatus. As shown in FIG. 9A, the change in the phase shift on the photosensitive drum 102 with respect to the change in the internal temperature of the image forming apparatus 100 exhibits a linear characteristic with slope K', and is a characteristic that is almost the same in the entirety of the scanning region, regardless of the position in the main scanning direction.

$T_{refC}$, which is the temperature corresponding to the point of intersection with the X axis (reference temperature) in the phase shift characteristic shown in FIG. 9A is a temperature used as a reference for aligning the phases of the laser beams in the entirety of the scanning region in the main scanning direction. If the internal temperature of the image forming apparatus 100, which is measured using the temperature monitoring element 410 (FIG. 4), is $T_{refC}$, the phase shift is 0, which indicates that the phases of the lasers are aligned in the entirety of the scanning region in the main scanning direction.

The temperature monitoring element 410, which is connected to the CPU 401, is included in the image forming apparatus 100 of the present embodiment. The temperature monitoring element 410 obtains the internal temperature of the image forming apparatus 100. Specifically, the temperature monitoring element 410 measures the internal temperature of the optical scanning apparatus 104, the temperature of the light source 201, or the temperature of the optical scanning apparatus 104 and the light source 201.

The CPU 401 can obtain temperature information indicating the internal temperature of the image forming apparatus 100 from the temperature monitoring element 410 at a predetermined timing. The CPU 401 generates a count value $C_{DC}$ corresponding to a temperature value DC indicated by the obtained temperature information. Note that the phase shift correction based on a converted phase shift characteristic can be realized by replacing $C_{DT}$ and $C_{refB}$ with $C_{DC}$ and $C_{refC}$ respectively in the control described with reference to FIG. 5 in the first embodiment.

Figure 15:
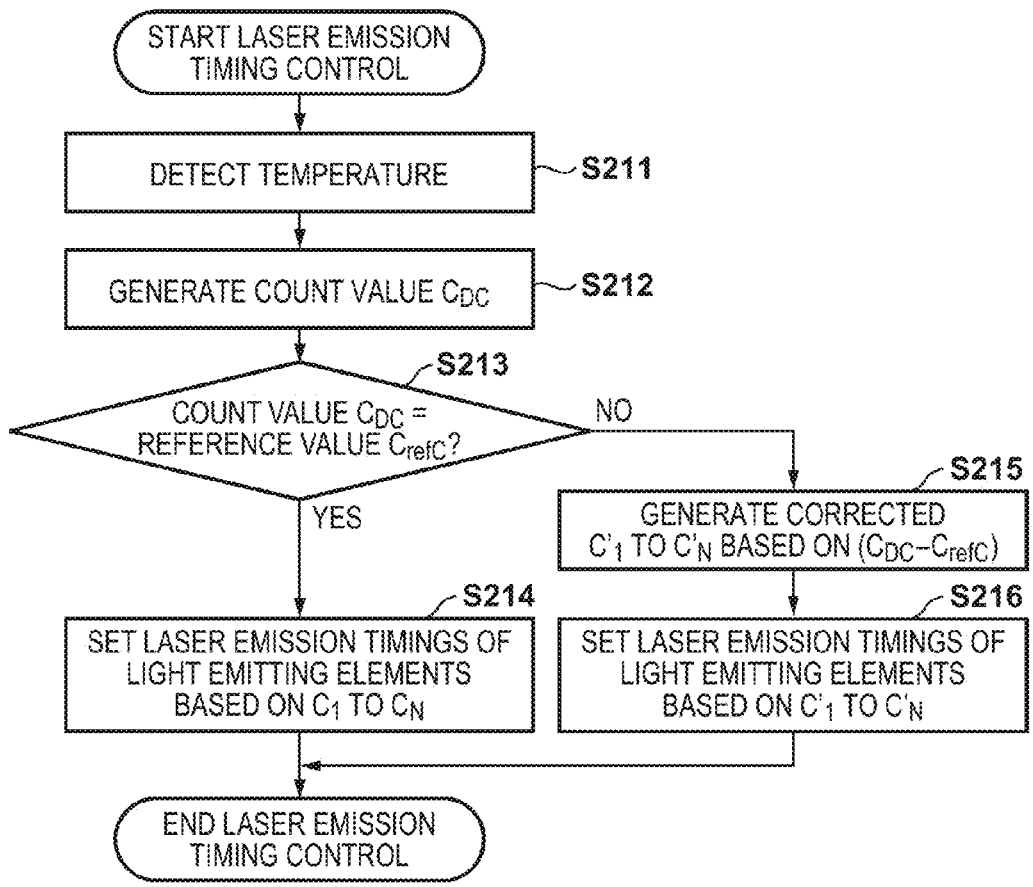
FIG. 15 is a flowchart showing a procedure of laser emission timing control (step S102) according to a third embodiment.
Figure 17:
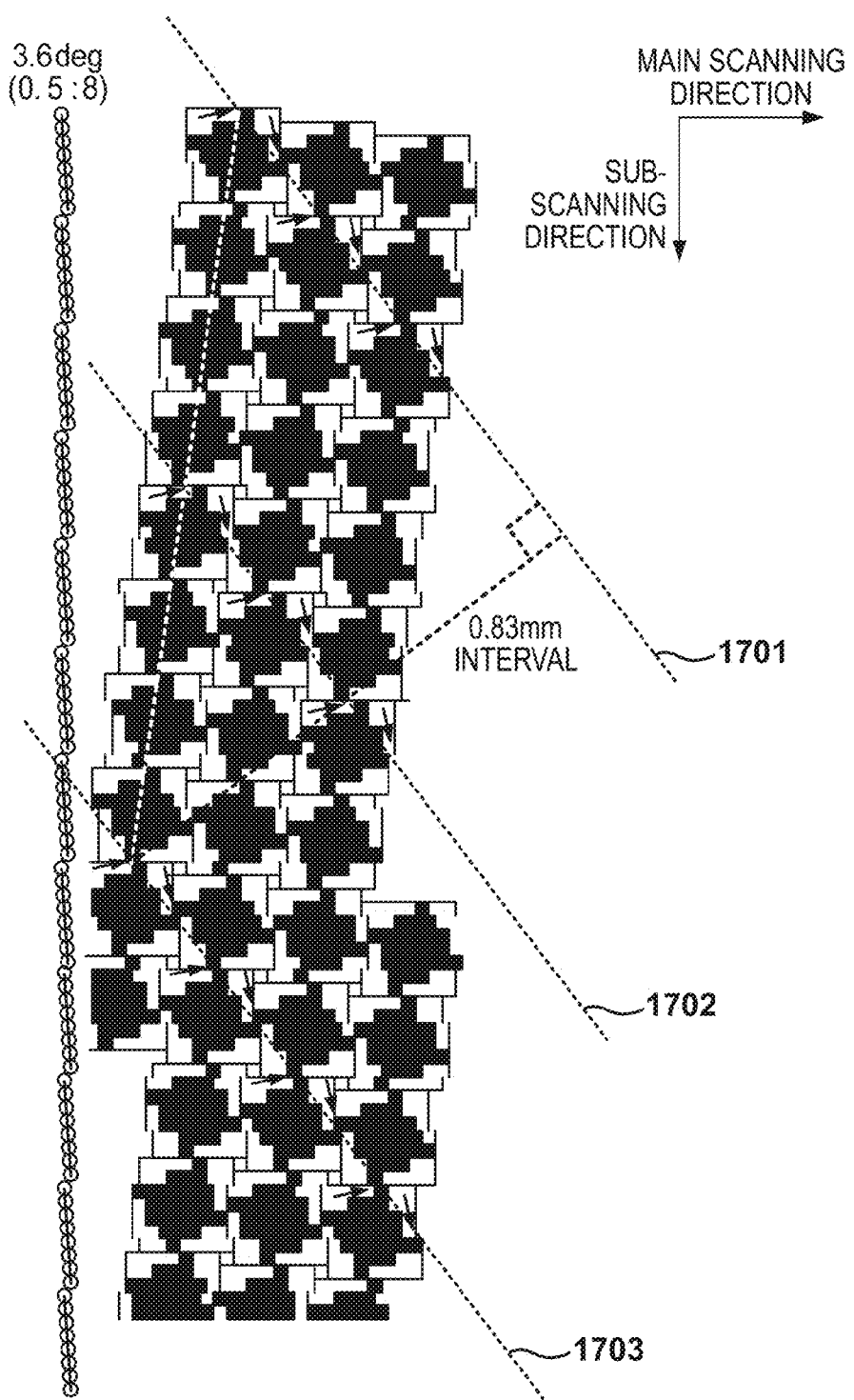
FIG. 17 is a diagram showing an enlarged image of the 50% HT image shown in FIG. 16A.

In the present embodiment, image formation processing is executed by the image forming apparatus 100 using the procedure shown in the flowchart in FIG. 10, similarly to the first embodiment. Note that in step S102, the CPU 401 executes laser emission timing control for the light emitting elements 1 to N in accordance with the procedure shown in FIG. 15 (steps S211 to S216).

In step S211, the CPU 401 detects the internal temperature DC of the image forming apparatus 100 based on temperature information obtained from the temperature monitoring element 410. Furthermore, in step S212, the CPU 401 generates the count value $C_{DC}$ that corresponds to the temperature DC.

Next, in step S213, by comparing the count value $C_{DC}$ and the reference count value (reference value) $C_{refC}$, the CPU 401 determines whether or not $C_{DC}=C_{refC}$ is satisfied. If it is determined that $C_{DC}=C_{refC}$, the CPU 401 advances the processing to step S214. In step S214, based on $C_1$ to $C_N$, the CPU 401 sets the relative emission timings $T_1$ to $T_N$ according to which the light emitting elements emit laser beams based on the image data. $C_{refC}$ and $C_1$ to $C_N$, which are used in steps S213 and S214, are read out from the memory 406.

On the other hand, if it is determined in step S213 that $C_{DC} \neq C_{refC}$, the CPU 401 advances the processing to step S215. In step S215, the CPU 401 calculates $C_{cor}=C_{DC}-C_{refC}$, and corrects $C_1$ to $C_N$ based on $C_{cor}$ to generate $C'_1$ to $C'_N$. Furthermore, in step S216, based on $C'_1$ to $C'_N$, the CPU 401 sets the laser beam emission timings $T_1$ to $T_N$ for the light emitting elements.

With that, the CPU 401 ends the laser emission timing control for the light emitting elements 1 to N in step S102 and advances the processing to step S103. The processing of steps S103 and S104 is similar to that of the first embodiment.

According to the present embodiment, similarly to the first and second embodiments, it is possible to correct a phase shift with greater accuracy, and therefore it is possible to align the phases of the multiple laser beams that scan the photosensitive drum 102.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-107484, filed May 23, 2014, which is hereby incorporated by reference herein in its entirety.

What is claimed is:

1. An image forming apparatus, comprising:
    a light source configured to include a plurality of light emitting elements that are each configured to emit a light beam for exposing a photosensitive member;
    a deflection unit configured to deflect a plurality of light beams emitted from the plurality of light emitting elements such that the plurality of light beams scan the photosensitive member;
    a beam detection unit, provided at a position on which a light beam deflected by the deflection unit is incident, configured to generate, in response to the light beam being incident on the beam detection unit, a detection signal that indicates detection of the light beam deflected by the deflection unit;
    an image forming unit configured to form an image by developing an electrostatic latent image formed on the photosensitive member by exposure using the plurality of light beams;
    a correction unit configured to execute first correction to cause the image forming unit to form an image for correction and to correct, based on the formed image for correction, relative emission timings according to which the plurality of light emitting elements emit light beams based on image data, and second correction to measure a parameter corresponding to a state of the plurality of light beams scanning the photosensitive member and to correct, based on a value of the measured parameter, the relative emission timings for the plurality of light emitting elements; and
    a control unit configured to control the light source such that the plurality of light emitting elements emit light beams based on image data in accordance with the relative emission timings corrected by the correction unit,
    wherein when the first correction is to be executed, the correction unit executes the second correction before executing the first correction, and
    wherein in the second correction, the correction unit controls the light source such that first and second light emitting elements among the plurality of light emitting elements emit first and second light beams in sequence, and measures, as the parameter, a time interval between two detection signals that are generated by the beam detection unit and that correspond to the first and second light beams.

2. The image forming apparatus according to claim 1, wherein in the first correction, the correction unit causes the image forming unit to form the image for correction on a recording medium and receives input, by a user, of a correction value for correcting the emission timings based on the image formed on the recording medium.

3. The image forming apparatus according to claim 1, further comprising:
    a transfer member onto which an image formed by the image forming unit is transferred,
    wherein in the first correction, the correction unit determines a correction value for correcting the emission timings by reading the image for correction transferred onto the transfer member with an image sensor.

4. The image forming apparatus according to claim 1, wherein the correction unit executes the second correction when formation of an image based on image data is performed by the image forming unit.

5. The image forming apparatus according to claim 1, wherein the correction unit executes the first correction according to an execution instruction input by a user.

6. The image forming apparatus according to claim 1, further comprising:

a storage unit configured to store timing control data for controlling the relative emission timings for light beams based on image data, of each of the plurality of light emitting elements, wherein the correction unit corrects the timing control data stored in the storage unit.

7. The image forming apparatus according to claim 1, wherein in the second correction, the correction unit corrects the emission timings using a correction characteristic that indicates a relationship between the time interval and a phase shift in the plurality of light beams, the phase shift corresponding to a shift in relative scanning positions in a main scanning direction when the plurality of light beams scan the photosensitive member.

8. The image forming apparatus according to claim 1, wherein in the second correction, the correction unit measures an internal temperature of the image forming apparatus as the parameter.

9. The image forming apparatus according to claim 1, wherein the correction unit corrects the emission timings for the plurality of light emitting elements such that relative scanning positions in a main scanning direction when the plurality of light beams scan the photosensitive member coincide with each other.

10. The image forming apparatus according to claim 1, wherein the image forming unit includes:
 the photosensitive member;
 a charging unit configured to charge the photosensitive member; and
 a developing unit configured to develop an electrostatic latent image formed on the photosensitive member by exposure using the plurality of light beams so as to form, on the photosensitive member, an image to be transferred onto a recording medium.

11. An image forming apparatus, comprising:
a photosensitive member;
an optical scanning apparatus comprising: a light source including a first light emitting element configured to emit a first light beam and a second light emitting element configured to emit a second light beam; a deflection unit configured to deflect the first light beam and the second light beam such that the first light beam and the second light beam scan the photosensitive member; and a beam detection unit, provided on a scanning path of the first light beam and the second light beam deflected by the deflection unit, and configured to generate a first signal in response with scanning by the first light beam and to generate a second signal in response with scanning by the second light beam;
an image forming unit configured to form an toner image by developing, using a toner, an electrostatic latent image formed on the photosensitive member by exposure of the first light beam and the second light beam, and configured to transfer the toner image developed on the photosensitive member to a recording medium;
a receiving unit configured to receive an input by user; and
a controller configured to execute a first correction mode and a second correction mode for correcting a relative emission start timing between the first light emitting element and the second light emitting element in one scanning period of the first and second light beams, wherein the controller is configured to: in the first correction mode, cause the optical scanning apparatus and the image forming unit to output a recording medium on which a test pattern for correcting the relative emission start timing is formed; and in the second mode, measure a time interval between the first signal and the second signal, and correct the relative emission start timing between the first light emitting element and the second light element in the one scanning period of the first and second light beams, and wherein the controller is configured to, in a case where the receiving unit receives the input for executing the first correction mode, execute the second correction mode and, after that, execute the first correction mode.

12. The image forming apparatus according to claim 11, wherein the optical scanning apparatus further comprises a lens through which the first light beam and the second light beam deflected by the deflection unit pass, and
wherein the beam detection unit is scanned by the first light beam and the second light beam which have passed through the lens.

13. The image forming apparatus according to claim 11, wherein the controller is configured to determine an emission start timing for the first light emitting element and an emission start timing for the second light emitting element by using a generation timing of the first signal as a reference in the one scanning period, and to correct the emission start timing for the second light emitting element by correcting the emission start timing with respect to the generation timing of the first signal in the one scanning period.

14. The image forming apparatus according to claim 11, wherein the first light emitting element and the second light emitting element are arranged such that a scanning position of the first light beam precedes a scanning position of the second light beam in a scanning direction of the first light beam and the second light beam.

15. The image forming apparatus according to claim 11, further comprising:
a memory configured to store a reference value to be used as a reference for the time interval,
wherein the controller is configured to control the relative emission start timing based on a comparison result between the measured time interval and the reference value.

16. The image forming apparatus according to claim 11, wherein the test pattern includes a plurality of images formed on different positions in a rotation direction of the photosensitive member, and the plurality of images are formed by causing the relative emission timing to be different for each image.

17. The image forming apparatus according to claim 16, wherein the plurality of image are formed on a same screen.

* * * * *